Figure 17:
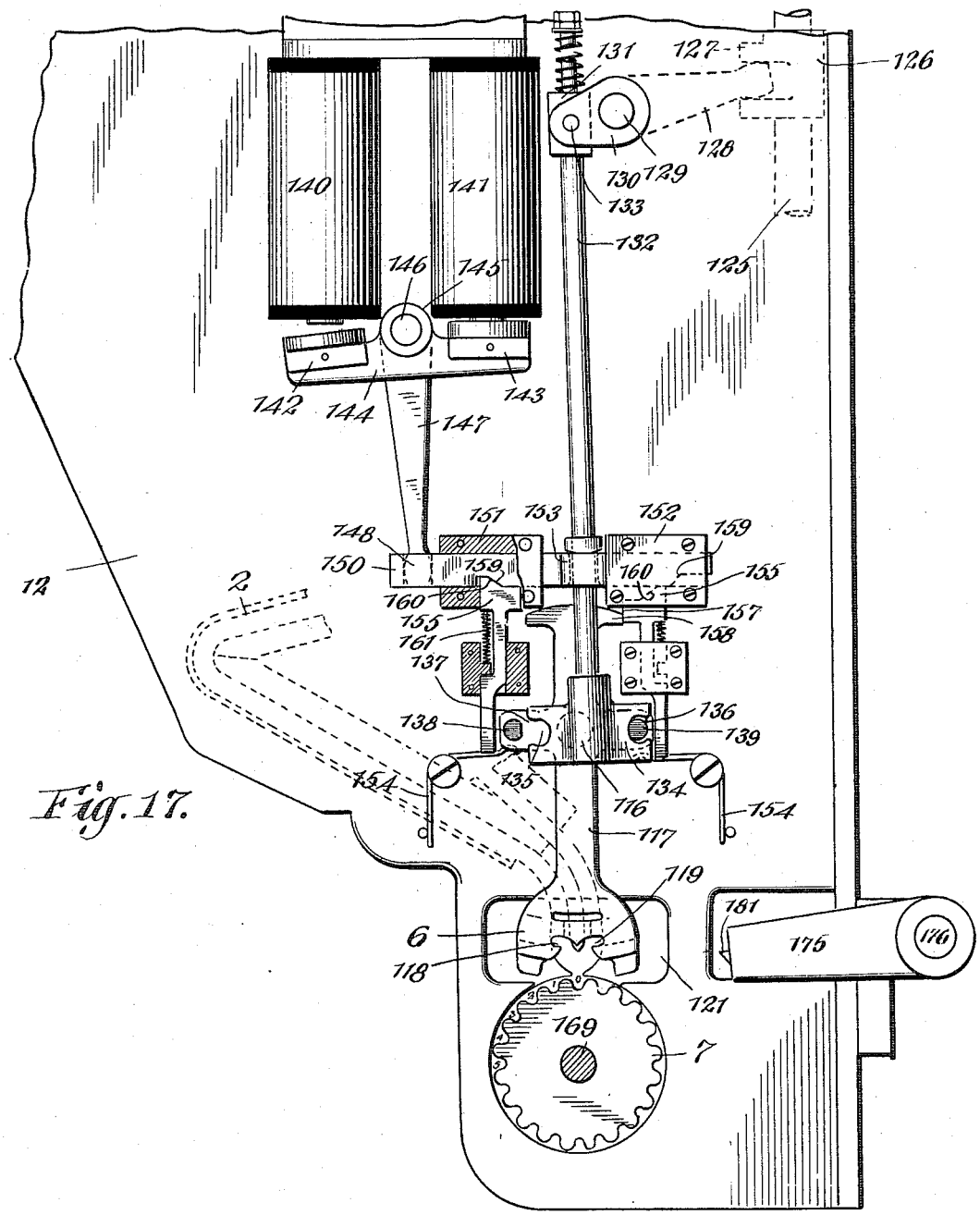

W. NICHOLAS & W. ACKERMAN.
TYPE CASTING AND COMPOSING MACHINE.
APPLICATION FILED MAY 22, 1909.
964,679.
Patented July 19, 1910.
19 SHEETS—SHEET 1.
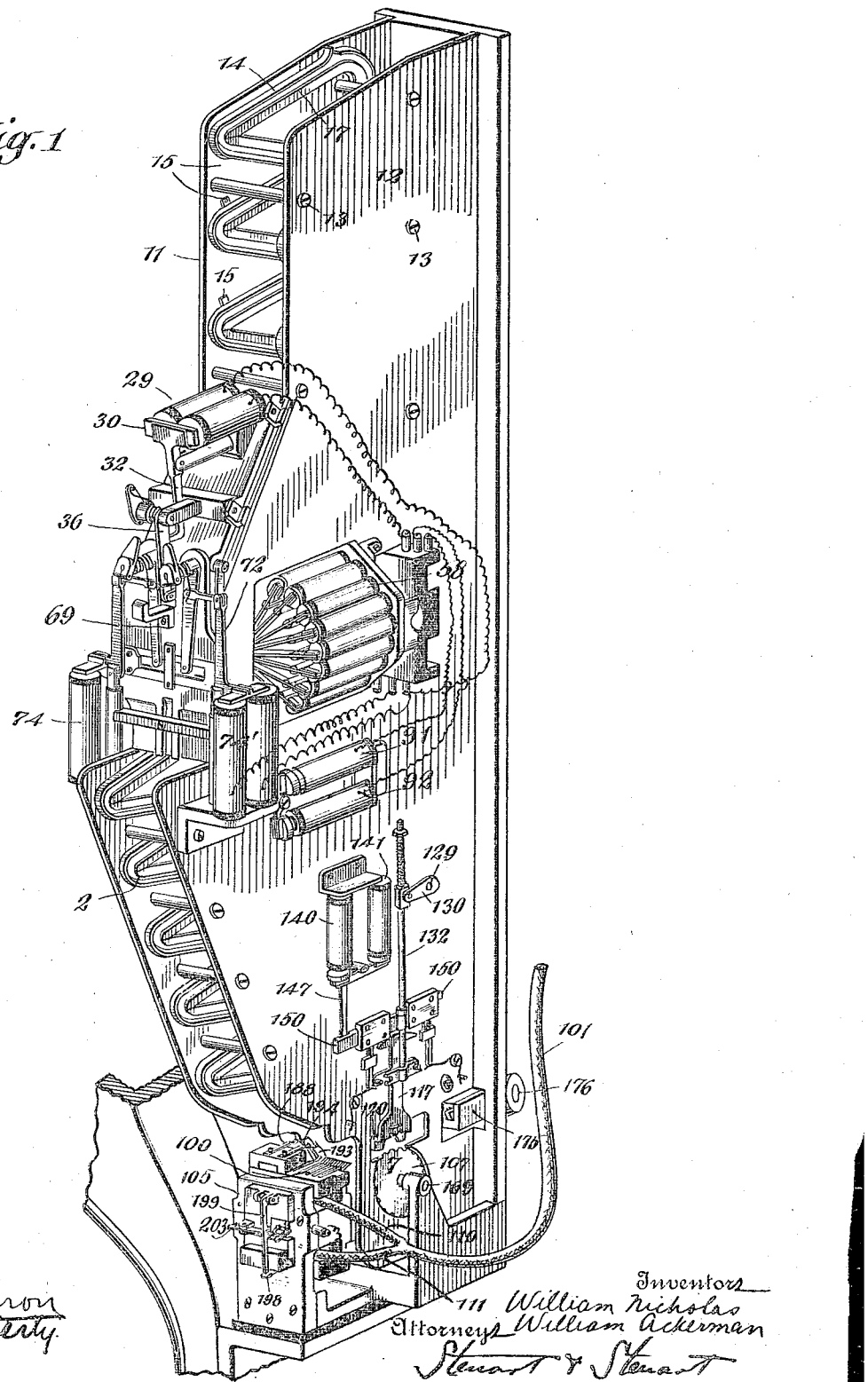

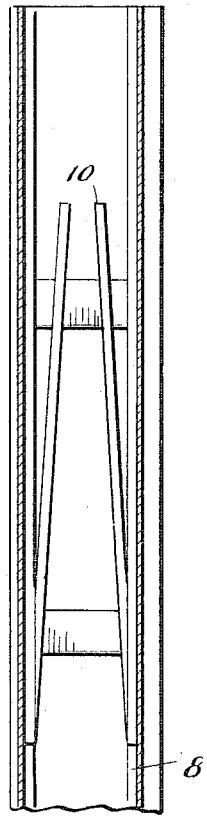
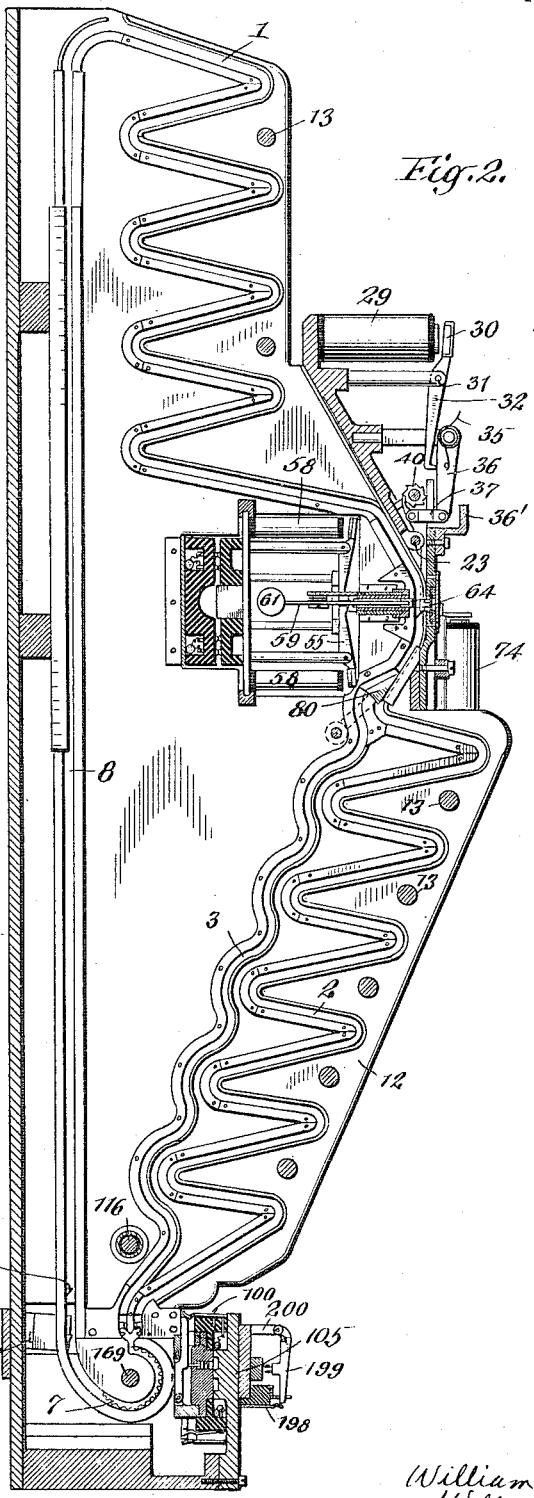

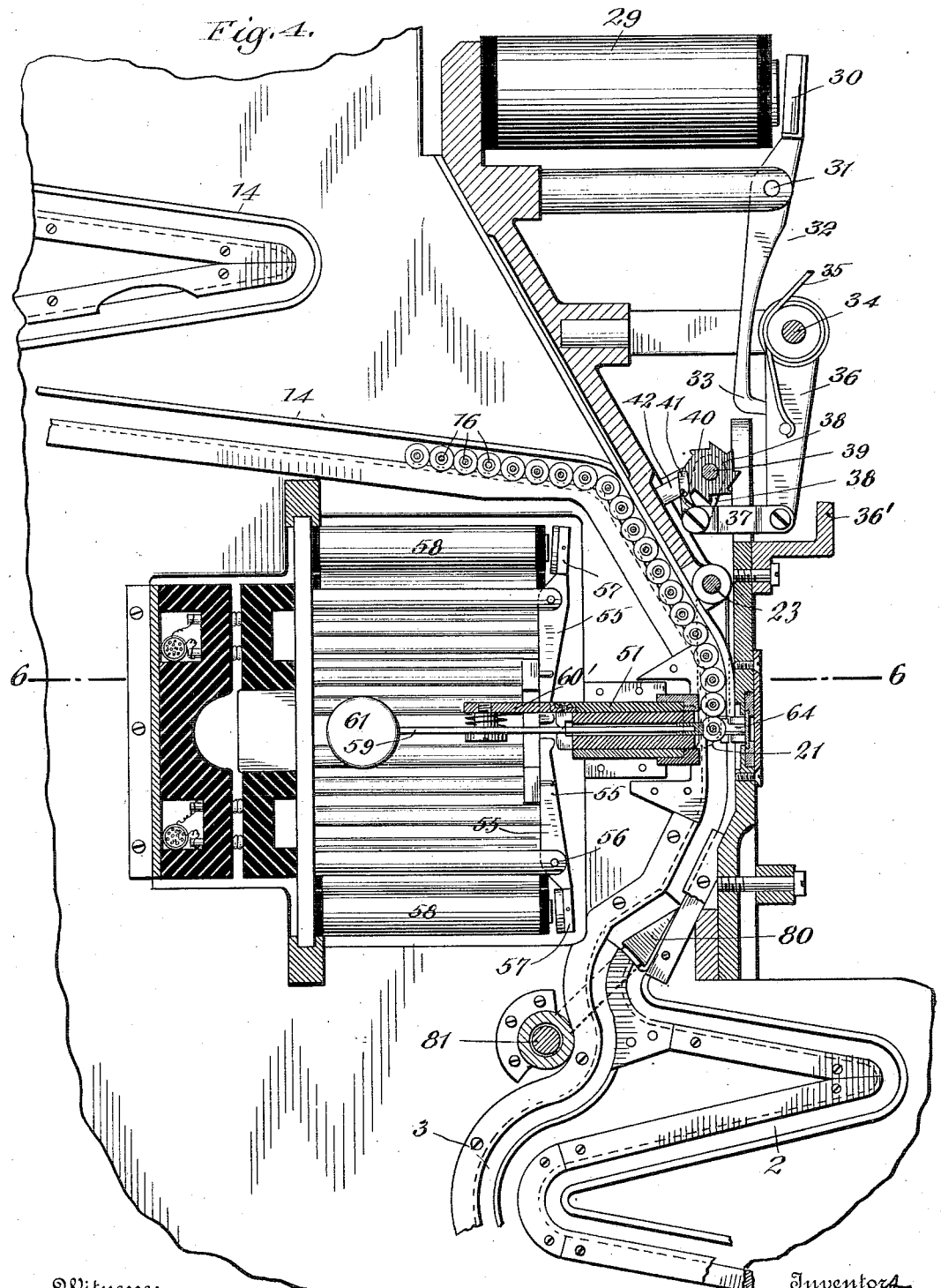

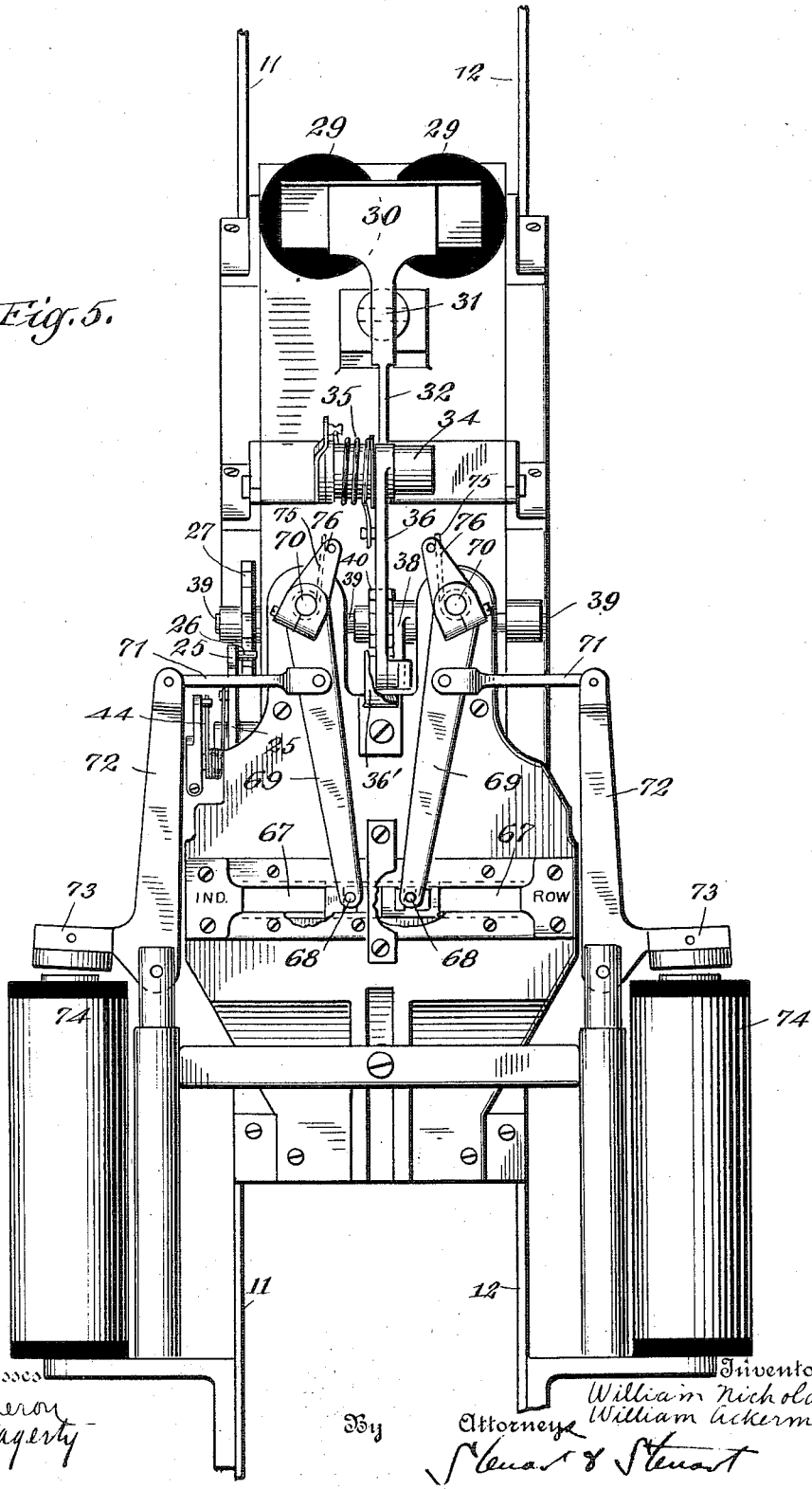

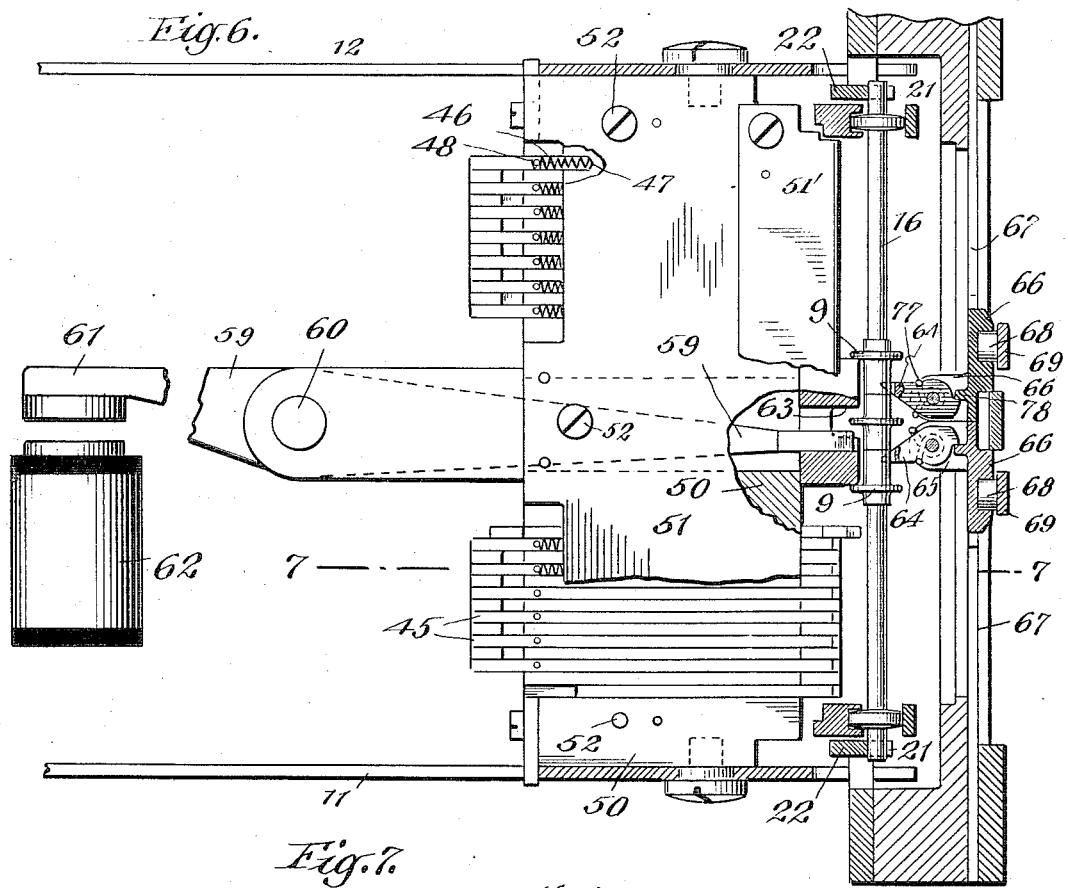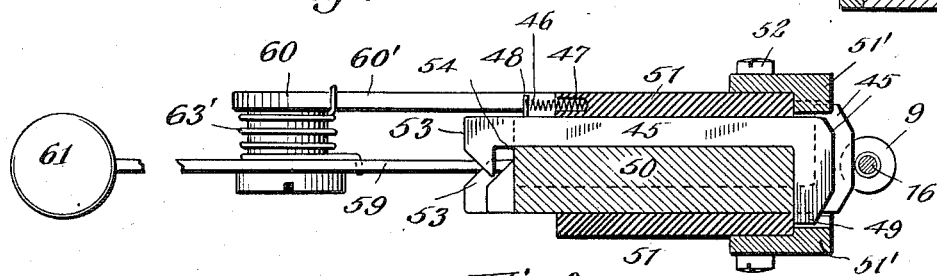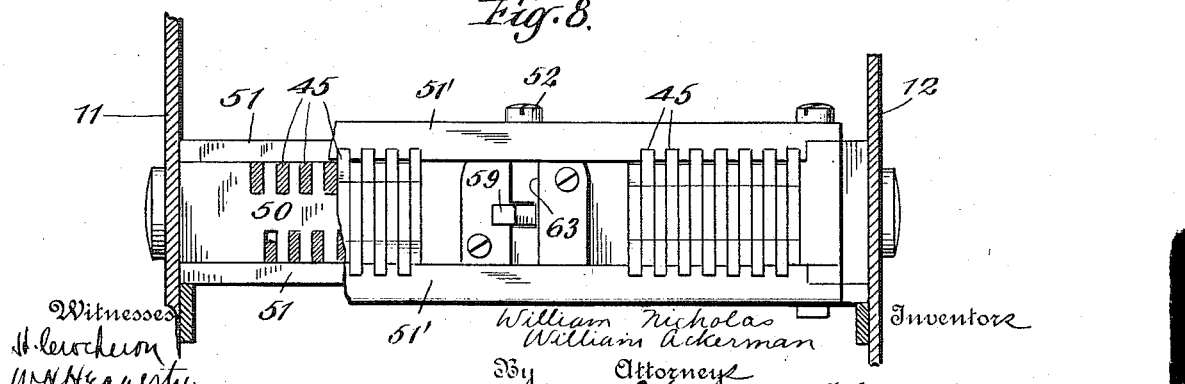

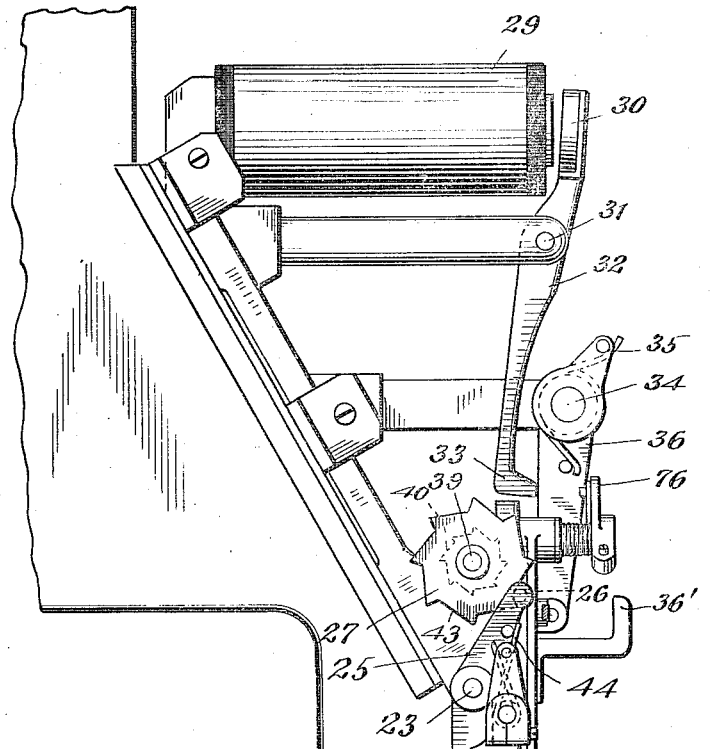
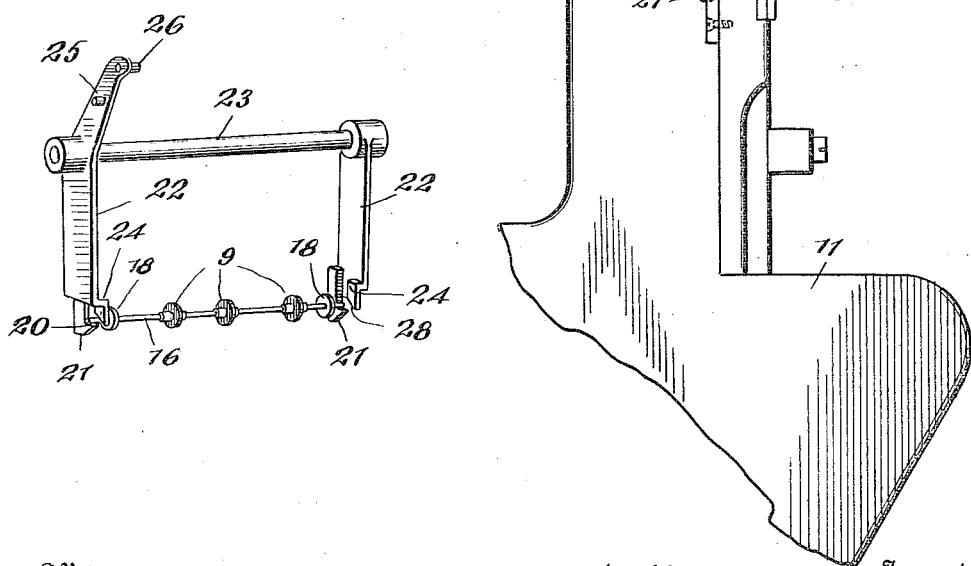

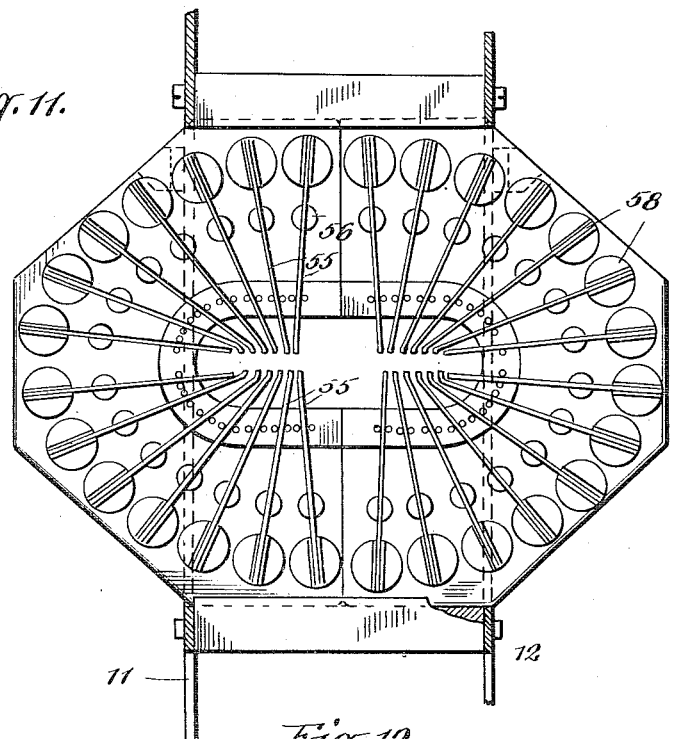
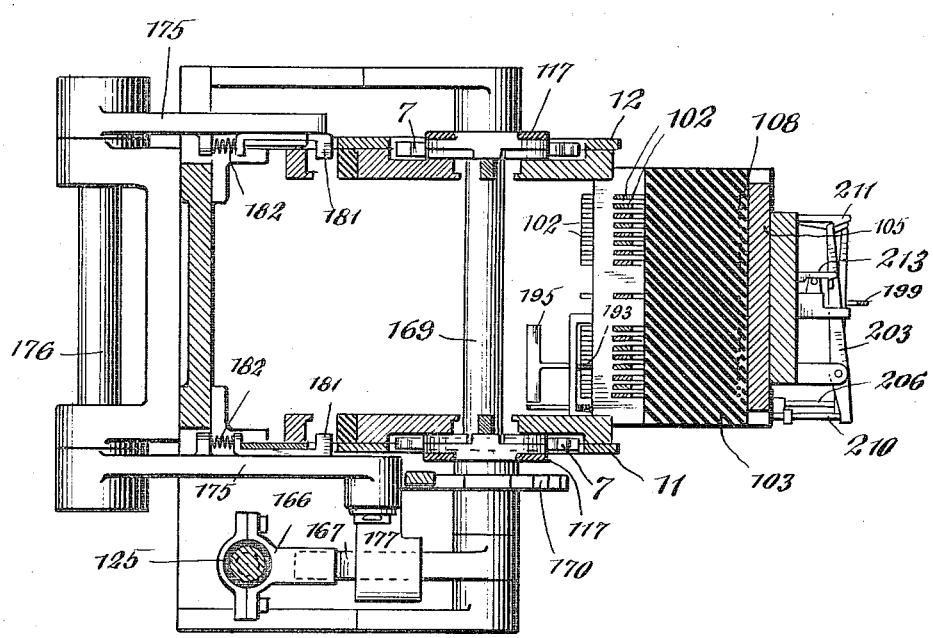

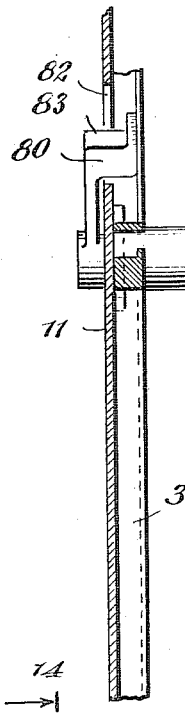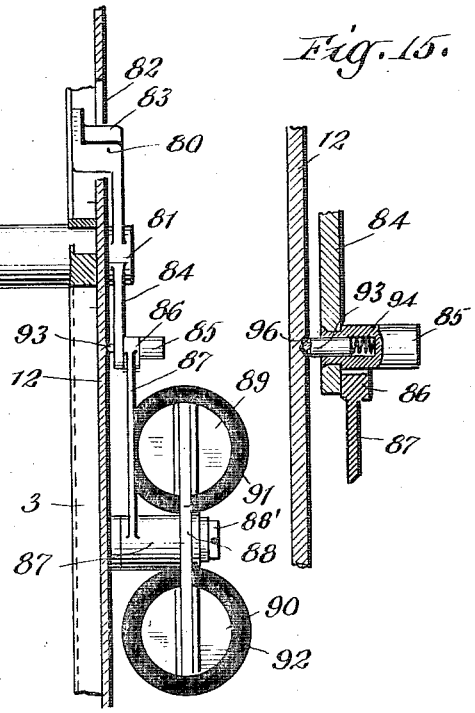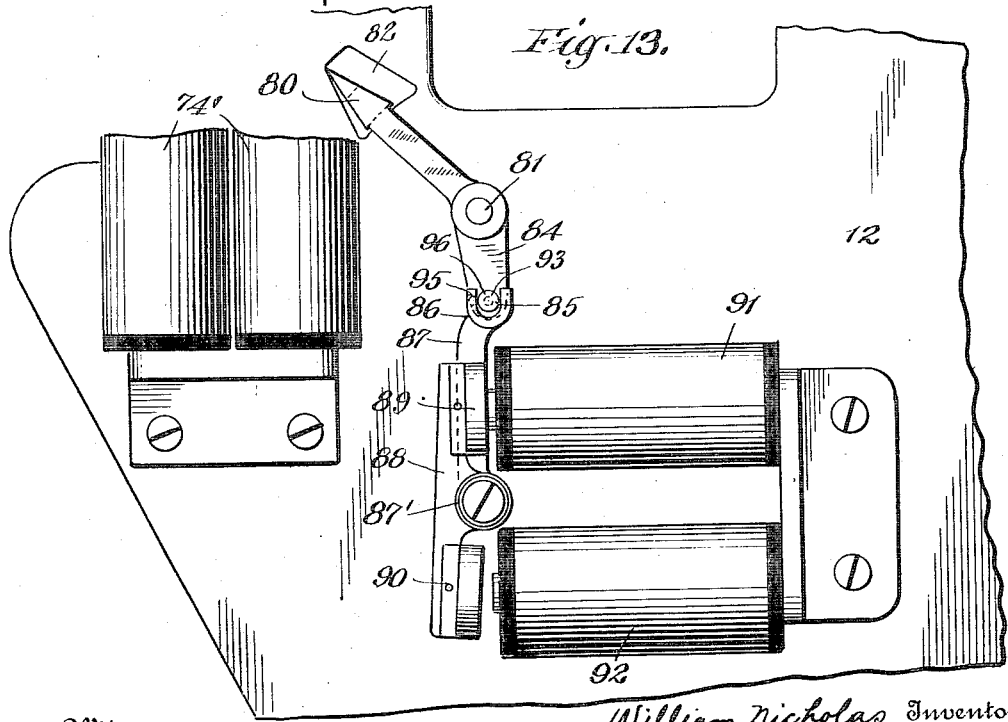

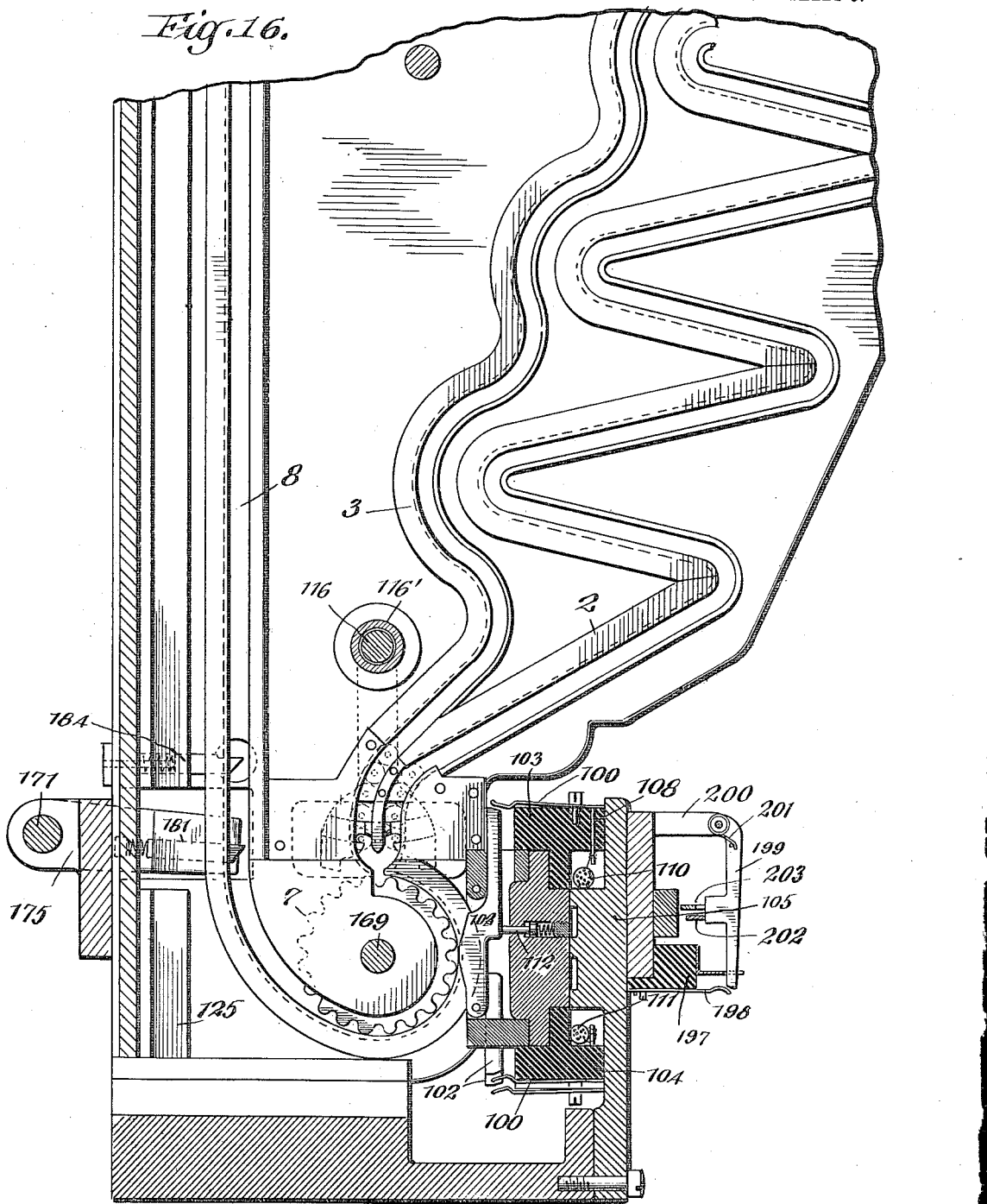

W. NICHOLAS & W. ACKERMAN.
TYPE CASTING AND COMPOSING MACHINE.
APPLICATION FILED MAY 22, 1909.

964,679.

Patented July 19, 1910.
19 SHEETS—SHEET 10.

W. NICHOLAS & W. ACKERMAN.
TYPE CASTING AND COMPOSING MACHINE.
APPLICATION FILED MAY 22, 1909.
964,679.
Patented July 19, 1910.
19 SHEETS—SHEET 11.
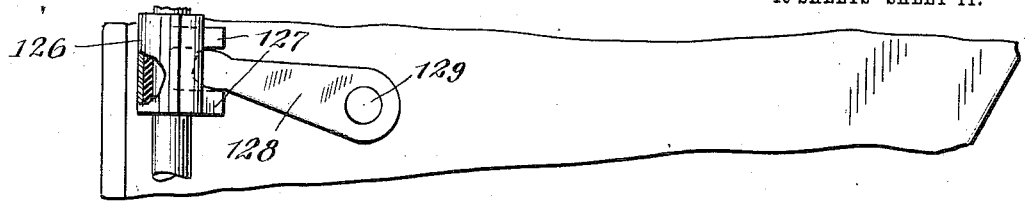
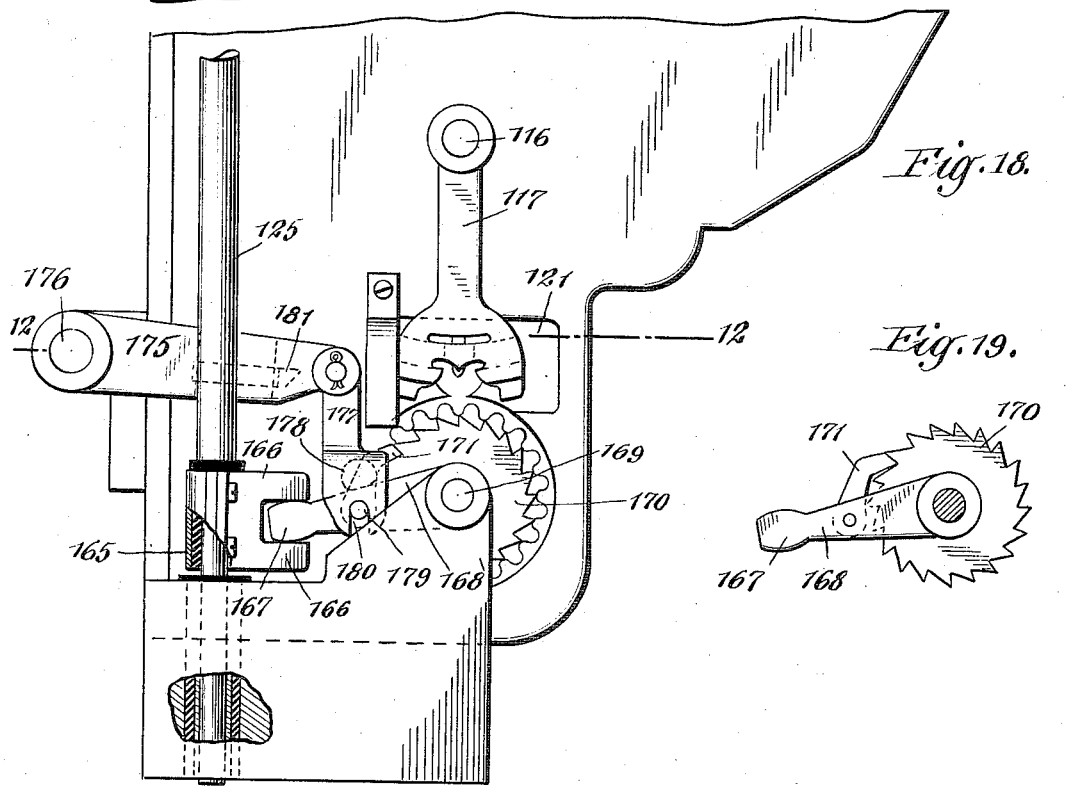
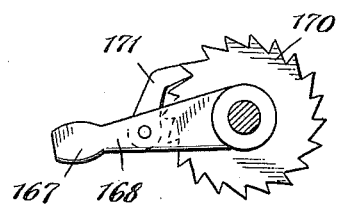
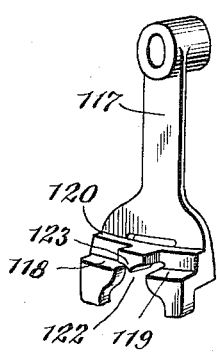
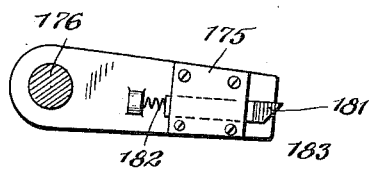

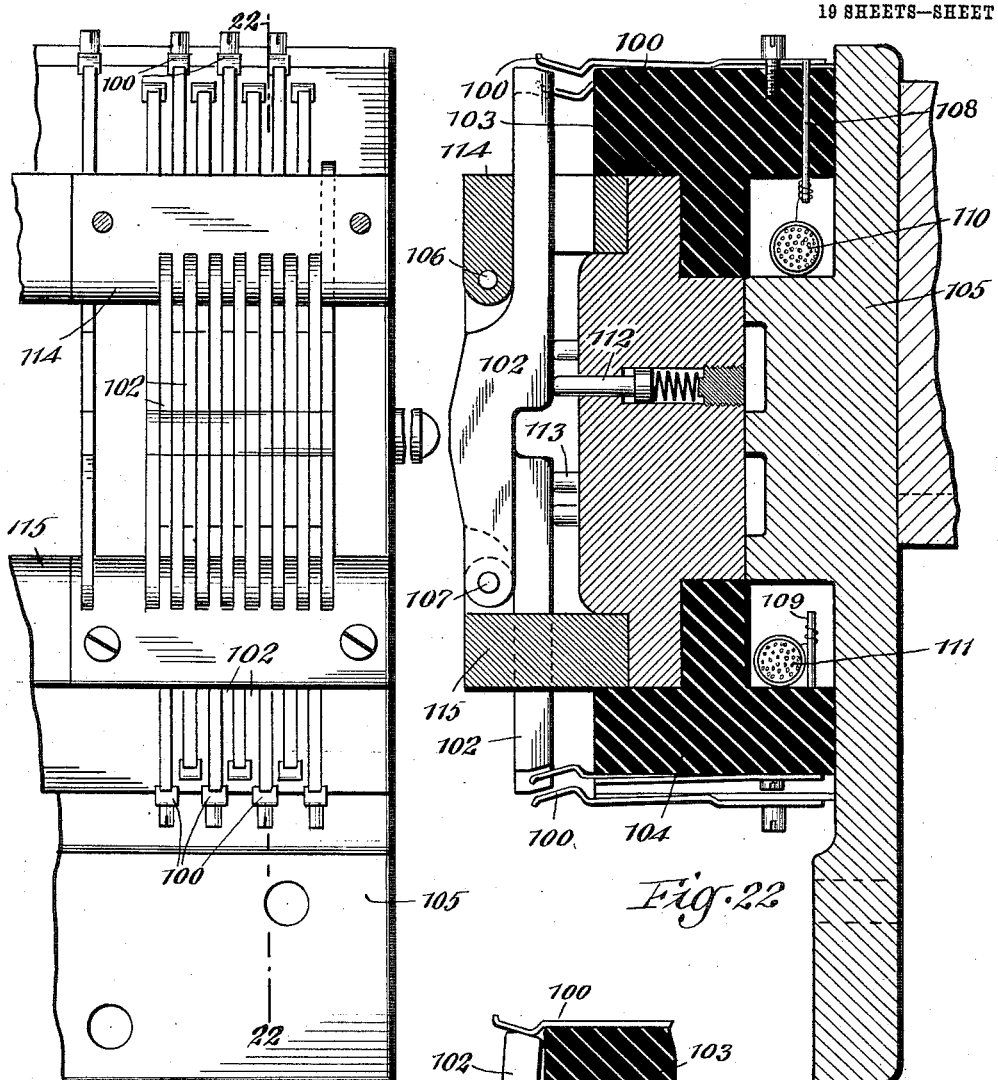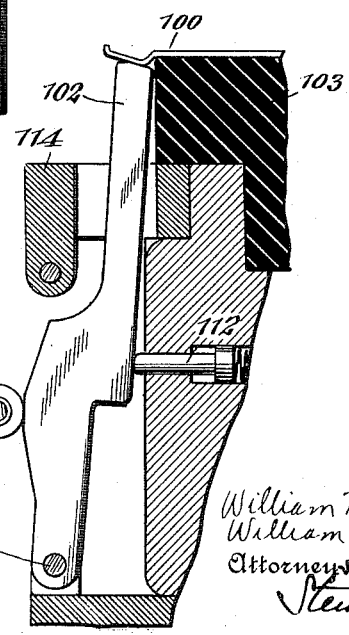

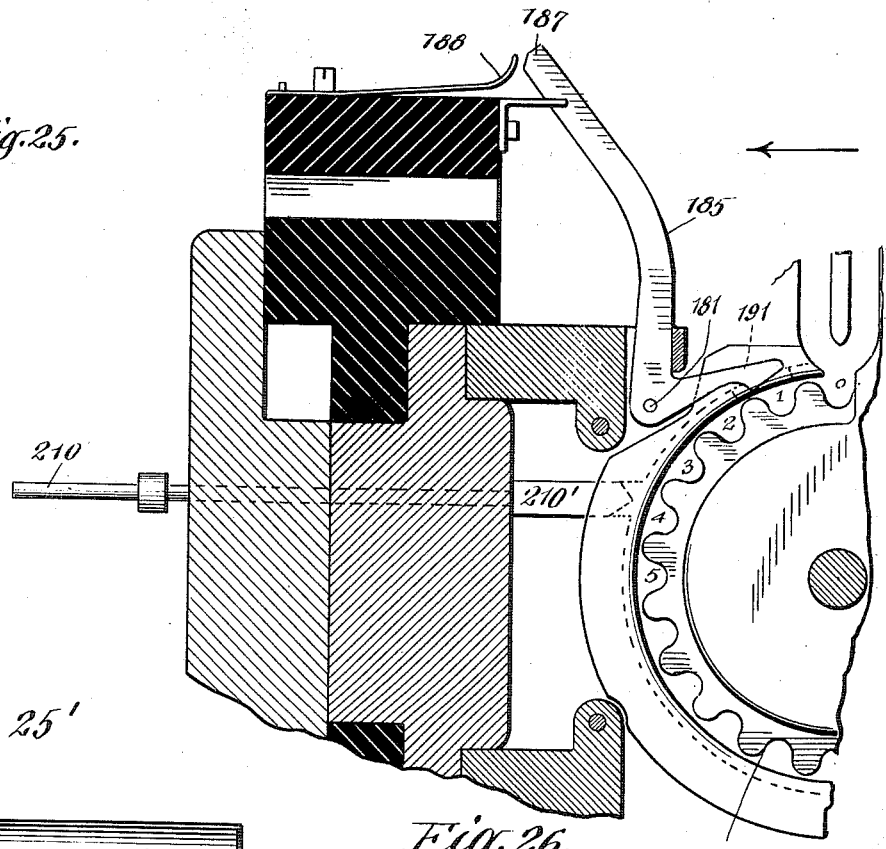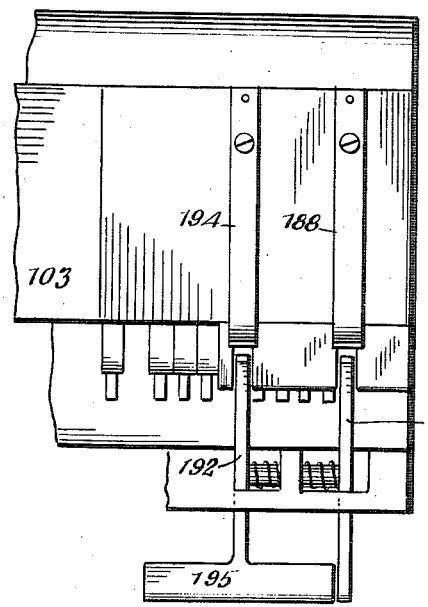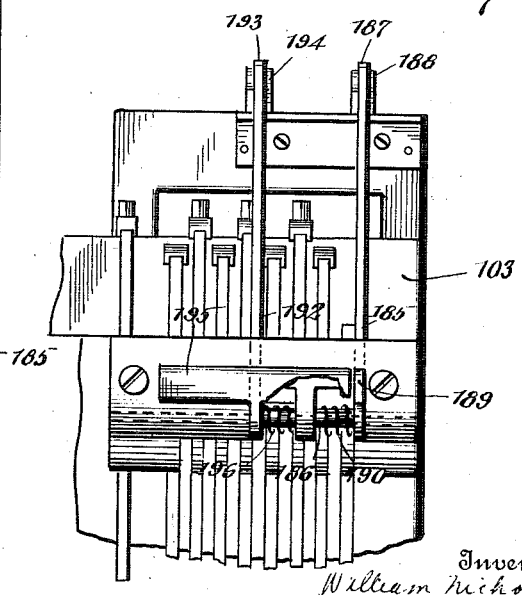

W. NICHOLAS & W. ACKERMAN.
TYPE CASTING AND COMPOSING MACHINE.
APPLICATION FILED MAY 22, 1909.
964,679.
Patented July 19, 1910.
19 SHEETS—SHEET 14.
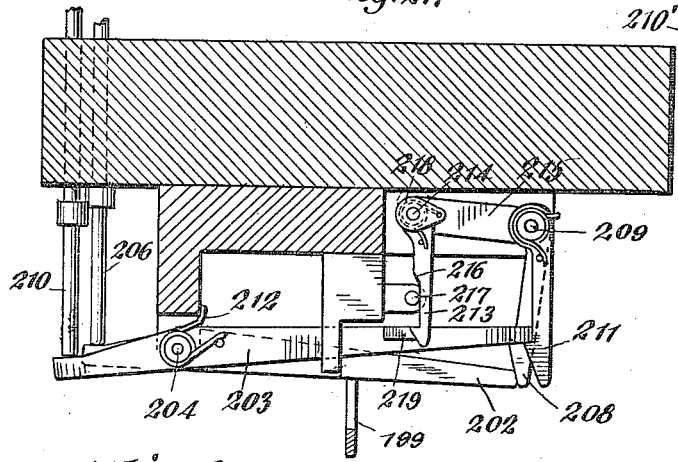
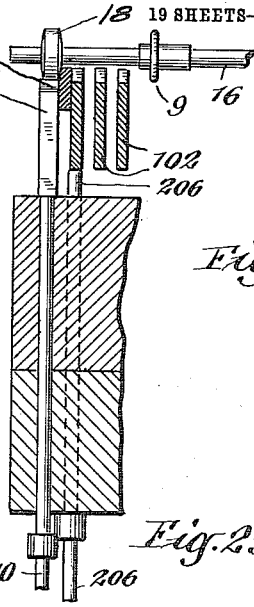
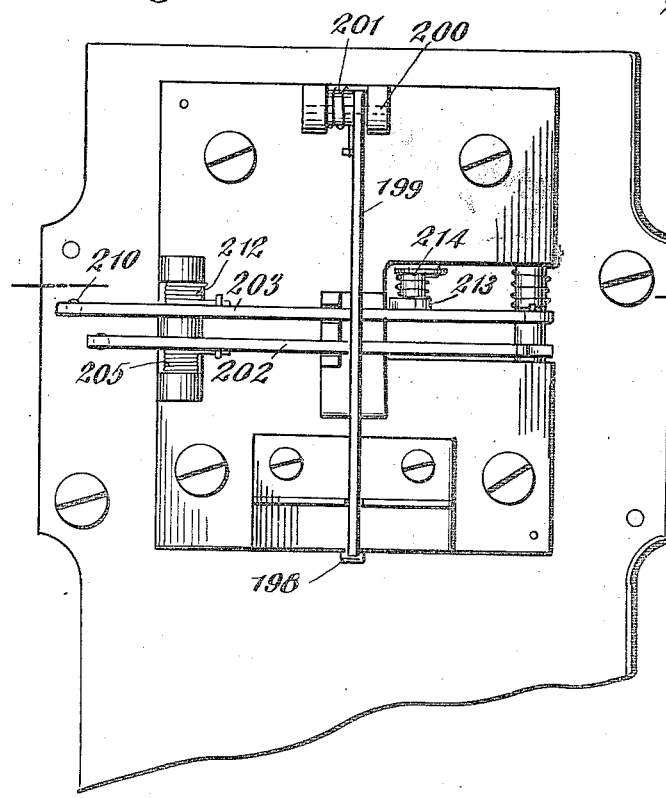
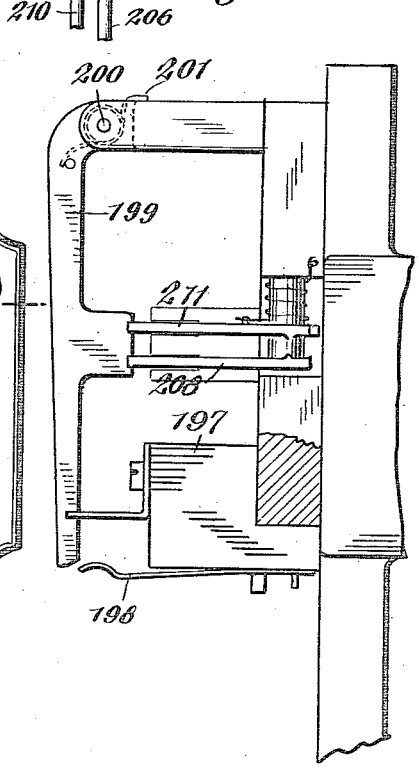
Witnesses
Inventors William Nicholas, William Ackerman
By Attorneys Stewart & Stewart

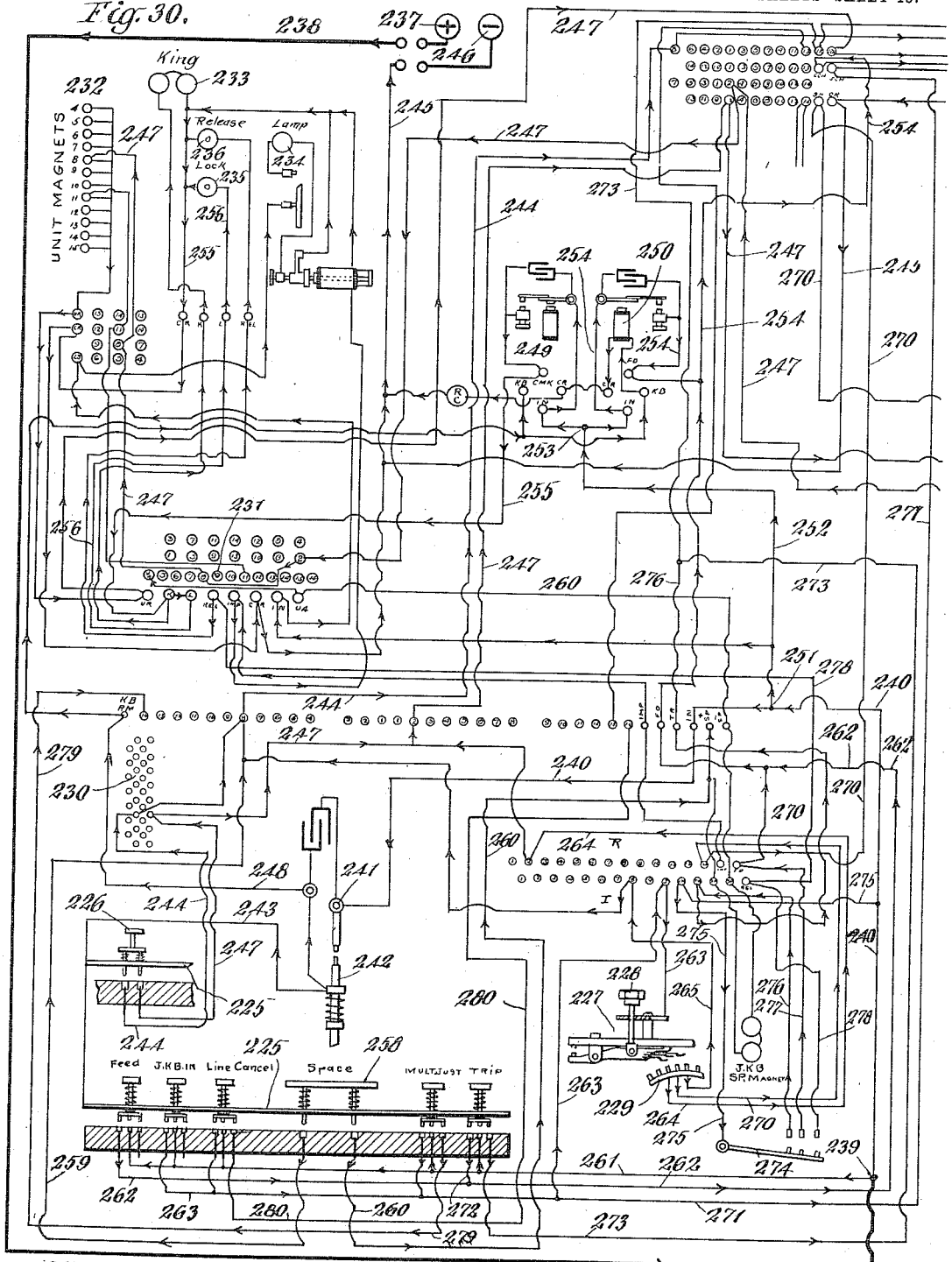

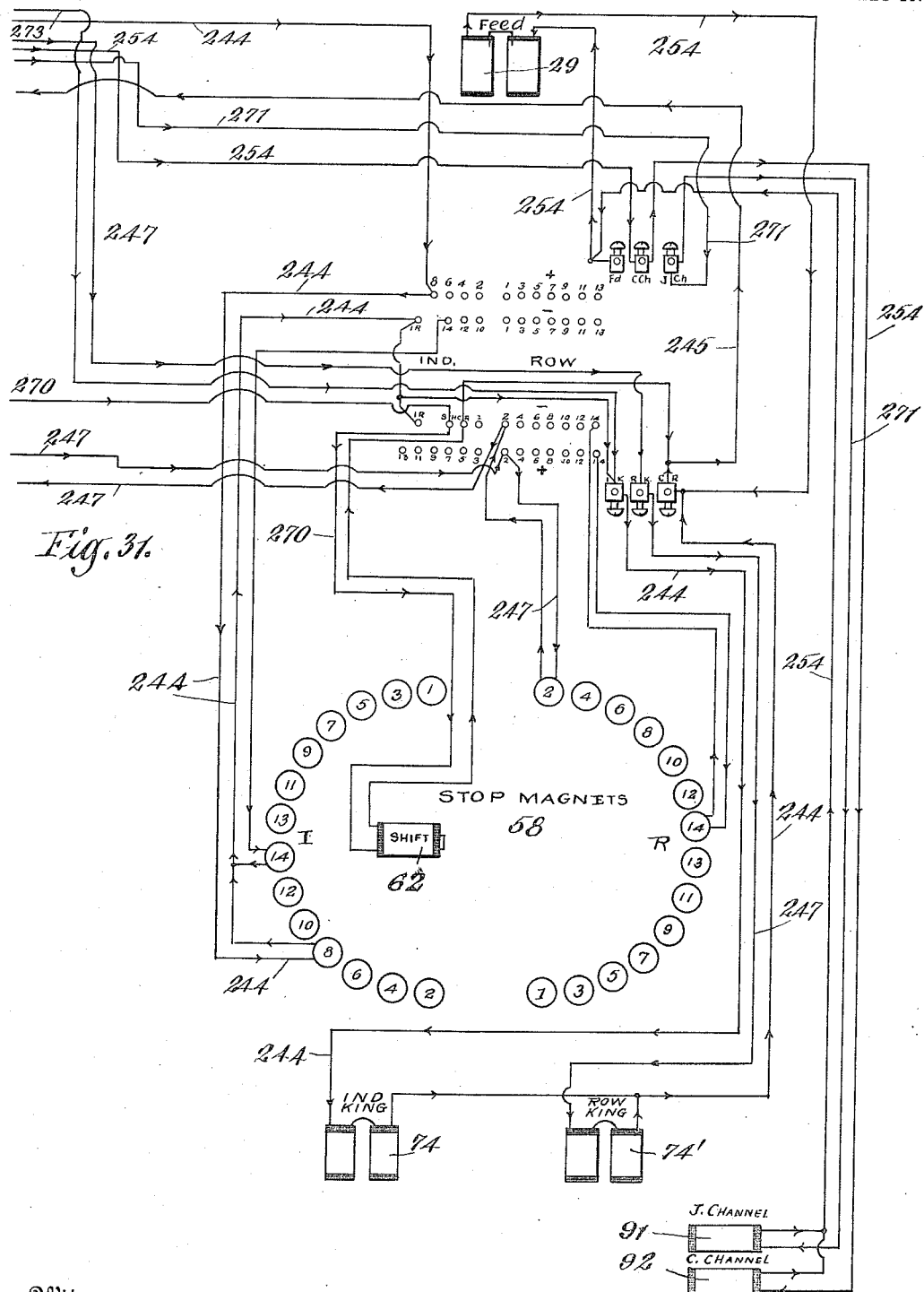

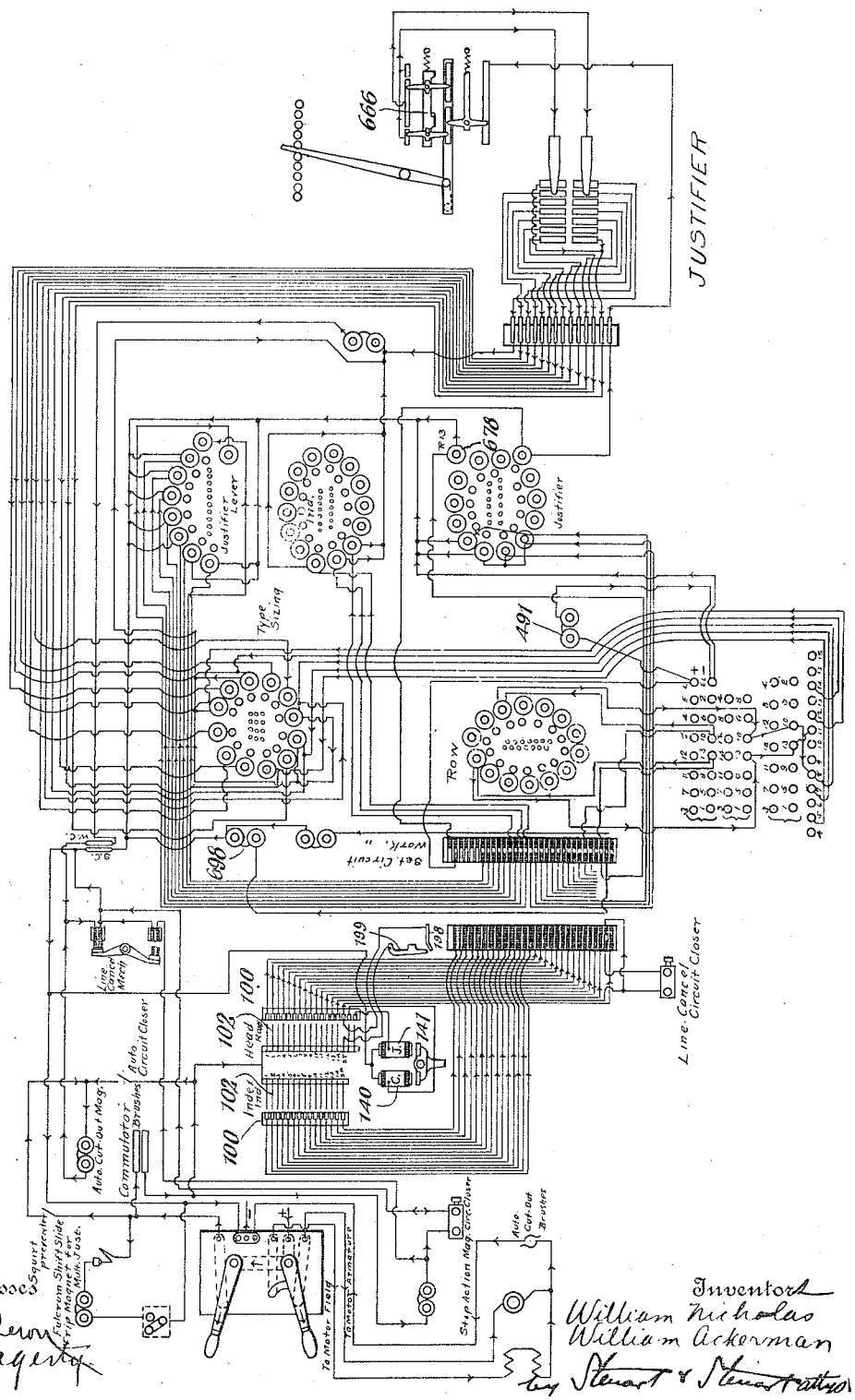

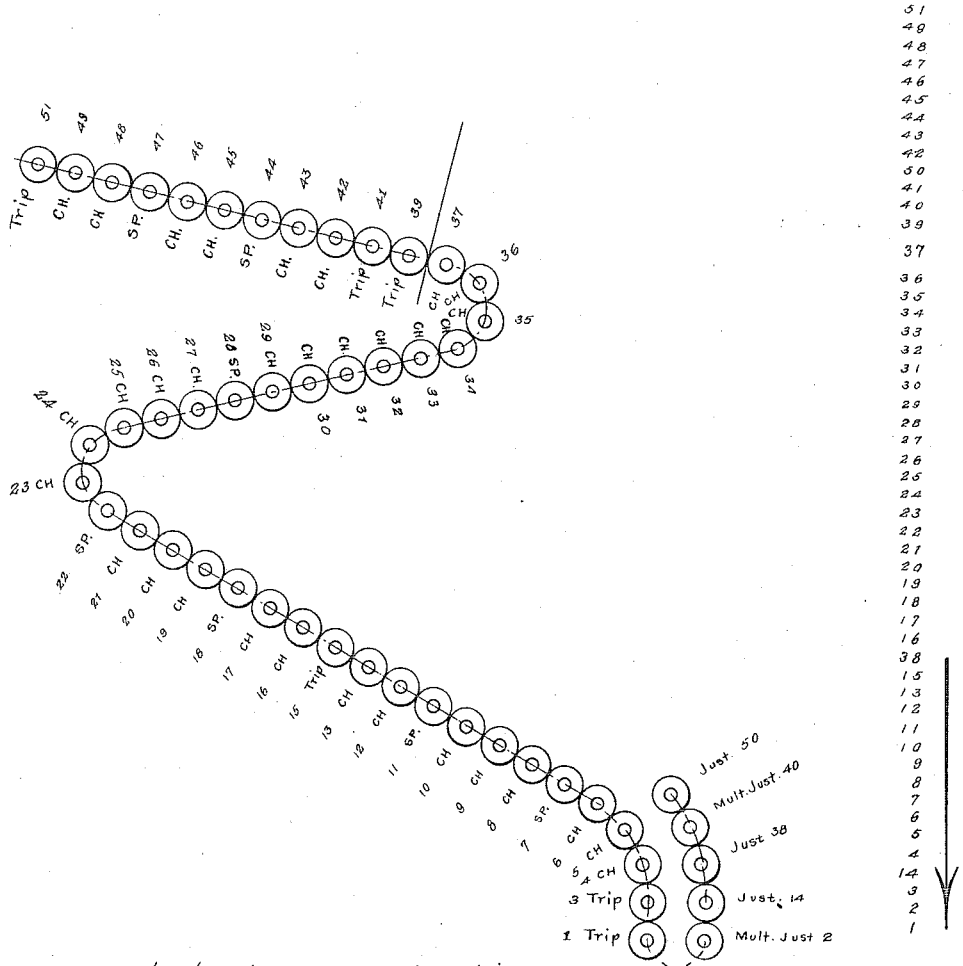

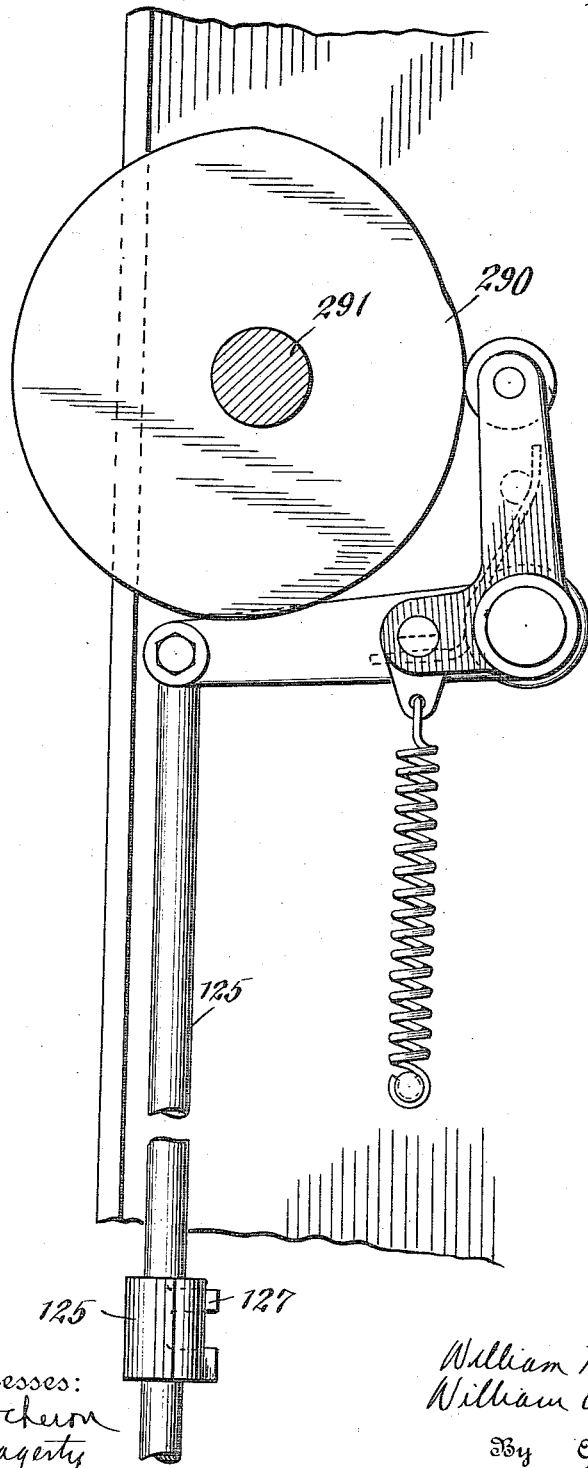

UNITED STATES PATENT OFFICE.

WILLIAM NICHOLAS AND WILLIAM ACKERMAN, OF NEW YORK, N. Y., ASSIGNORS TO UNITED STATES GRAPHOTYPE COMPANY, A CORPORATION OF NEW YORK.

TYPE CASTING AND COMPOSING MACHINE.

964,679.  Specification of Letters Patent.  Patented July 19, 1910.

Application filed May 22, 1909. Serial No. 497,676.

*To all whom it may concern:*

Be it known that we, WILLIAM NICHOLAS, a subject of the King of Great Britain, and WILLIAM ACKERMAN, a citizen of the United States, both residents of the city, county, and State of New York, have invented certain new and useful Improvements in Type Casting and Composing Machines, of which the following is a specification.

Our invention relates to that class of type machinery in which a composition is first recorded upon a suitable controller, and in which certain mechanisms are thereafter set by the controller, according to the record thereon, to govern the casting and setting up of justified lines of type.

The result to be accomplished by the invention hereinafter to be described is to make possible the combination in a single machine of an apparatus which places the record on the controller, and an apparatus which is thereafter set by the controller.

An important object of the invention is a controller which is fed entirely automatically from one to the other of the combined mechanisms; and means whereby, of the records carried by the controller, the justification record, although necessarily the last for each line to be received on the controller, is the first for each line to act on the setting mechanisms.

Another object of the invention is a means for maintaining in the combined machine the same independence of action as if the machines were separate.

Heretofore two distinct and separate machines, each in charge of an operator, have ordinarily been employed to effect the operation of recording the composition, and the subsequent operation of casting the type. The space occupied by the two separate machines, the number of operators required to operate the same, and the necessity of transferring the record bearing controller from one machine to the other, have been serious objections to this class of machinery. The existence of these objectionable features has been largely due to certain difficulties inherent to the justification of the composition. The proper justification for any line, or section thereof, cannot readily be determined until the line has been recorded and its length registered. The justification, thus determined, is then duly registered on the controller immediately after the line record to which it relates. If, however, the spacing called for by any indicated justification is to be properly distributed along the line of type when cast and set up, the casting mechanism must be set for such indicated justification before the casting of the line commences. In other words, the order in which the justification record and the line record set the casting mechanism must be just the reverse of the order in which such records are placed upon the controller. Where as heretofore the recording and casting mechanisms are in separate machines, this reversal is easily effected by feeding the controller, usually a strip of tape, tail end foremost into the casting machine. Where, however, the one machine is to include both the recording and the casting mechanisms, this reversal of order of feed between the two operations has presented considerable difficulty, and has not been effected satisfactorily where a single controller is used.

In the present machine, we have overcome all of the difficulties presented by the requirements of justification. We have invented a novel style of controller and novel mechanism for manipulating the same in such a manner that the justification records will set the casting mechanism in advance of the character or line records to which such justifications relate. The controller of our invention, instead of being a continuous strip of perforated paper, as is common in the art, or some other continuous record-bearing surface, is composed of separate and independently movable elements each of which is adapted to receive and carry the record of some type character, or of some selected justification. These elements having received their appropriate records are then stored in suitable magazines, the character records in one magazine and the justification records in another magazine. From their respective magazines, and in the order required, the justification and character elements are then separately fed to the mechanism which sets the mold and the justifier, the justification elements taking their proper place at the head of the lines.

In uniting, by means of the present invention, a recording or composing machine and the casting machine in a single machine, we have not sacrificed that independence of action between the two machines which is highly desirable in this art. The operation of the casting mechanism is here independent of the operation of the keys by the operator. The operator may work a considerable and a variable distance behind the casting mechanism.

Numerous details of structure by means of which various requirements have been met, together with other objects of the invention, will hereinafter appear in connection with the accompanying drawings in which—

Figure 1 is a perspective view of the assembled apparatus. Fig. 2 is a view in side elevation of the assembled apparatus, with one of the side plates removed to show various parts of the apparatus normally connected by the side plates. Fig. 3 is a detail view in elevation showing the return and resetting guides for the controller devices. Fig. 4 is an enlarged view in side elevation of the apparatus for setting the controller devices; of the apparatus for releasing the devices from the setting apparatus; and of the means for guiding the devices to and from the setting apparatus. Fig. 5 is a view in front elevation of the mechanisms shown in Fig. 4. Fig. 6 is an enlarged detail plan view on the line 6—6 of Fig. 4, the frame work being partly broken to show the stops for setting the controller devices. Fig. 7 is a detail view in cross-section on the line 7—7 of Fig. 6. Fig. 8 is a view in front elevation of the controller setting stops and adjacent parts. Fig. 9 is a view in side elevation of the apparatus for feeding the controller devices to the setting apparatus, and for releasing the same therefrom when set. Fig. 10 is a detail view showing one of the controller members in place in the escapement mechanism which holds the same during the setting operation. Fig. 11 is a detail view showing the bank of magnets and armature levers which actuate the setting stops. Fig. 12 is a plan view on a cross-section on the line 12—12 of Fig. 18. Fig. 13 is an enlarged detail side view of the switch device which controls the delivery of the controller members to their respective justification or character channels or magazines. Fig. 14 is a front view of the device shown in Fig. 13, and of the channels or magazine with which it coöperates. Fig. 15 is a detail view of a spring device shown also in Fig. 13 for holding the switch lever against displacement. Fig. 16 is a view in side elevation of the apparatus (shown at the base of Fig. 2) consisting of the index head and of the means for guiding the controller members to the contacts of the index head; and of the means for lifting and guiding the controller members to the top of the machine for re-use. Fig. 17 is a view in side elevation of the rotary member for feeding the controller members to the contacts of the index head; and of the apparatus which releases the controller members from the character or the justification magazines as the case may be. Fig. 18 is a view in side elevation of the apparatus for moving the rotary member which carries the controller members to the index contact levers; and of the means for lifting the controller members step by step to move the same up the return channel after they have passed the contacts. Fig. 19 is a detail view showing the pawl and ratchet mechanism for feeding the rotary member 7 shown in Fig. 17. Fig. 20 is a detail view in side elevation of the device for lifting the controller members up the return channel. Fig. 21 is a detail view in perspective of the escapement device shown in Fig. 17, for selecting and releasing the controller members from either the character or the justification channels to the wheel which feeds the same to the contact strips. Fig. 22 is a view in cross-section through the index head on the line 22—22 of Fig. 23, showing contact strips and the levers operated by the controller members for closing the circuits. Fig. 23 is a view of the index head looking from the rotary device 7 (see Fig. 16). Fig. 24 is a detail view showing one of the contact levers of the index head forced into engagement with one of the contacts of the latter by a controller device. Fig. 25 is a view in side elevation of certain contact devices operated by the controller members near the index head to control the magazine escapement device. Fig. 25' is a top plan view of the parts shown in Fig. 25. Fig. 26 is a view of the upper portion of the mechanism shown in Fig. 25, looking in the direction of the arrow in Fig. 25. Fig. 27 is a view in side elevation of certain contact devices controlling the setting of the "trip" mechanism for justification at the end of a line, or justified section thereof. Fig. 27' is a view showing the coöperation of the controller elements with the plungers 206 and 210 of Fig. 27. Fig. 28 is a view of the mechanism shown in Fig. 27 looking in the direction of the arrow, Fig. 27. Fig. 29 is a side view of the mechanism shown in Fig. 28. Figs. 30 and 31 together comprise a diagrammatic view of the circuits controlled from the operator's key-boards, the parts controlled by such circuits being also indicated. Fig. 32 is a diagrammatic view of the circuits of the casting, of the justification, and of the other mechanisms controlled from the index head. Fig. 33 is a diagrammatic view showing the order in which the controller members are fed to their respective magazines. Fig. 34 is a diagrammatic view showing the order in which the controller members are fed from their respective magazines. Fig. 35 is a view in side elevation of the cam on the power shaft and connection therefrom for operating the feed to the index head and other parts.

The controller, briefly stated, consists of a succession of shafts (see Fig. 10) supported and guided on rollers fixed thereto at either end, and each carrying three contact devices in the form of collars adjustable to different positions on the shafts, according to the desired setting. The controller members starting at the top of a channel 1 (see Figs. 1 and 2) pass down this channel until they reach the setting or selecting apparatus (see Figs. 4, 5 and 6). When the controller members reach the setting apparatus, each in turn is arrested while the setting stops (see Figs. 6, 7 and 8), operated from the keyboard, are projected into the path of the contact collars referred to, and the collars then moved against these selected stops by suitable means such as levers (see Fig. 5). Thereupon, each controller member is released, and passes down one or the other of two channels or magazines 2 and 3 (see Fig. 4). The channel or magazine 2 receives those of the devices which have been set for characters, and the channel or magazine 3, those of the devices which have been set for justifications. According to the setting of a switch 80 (see Fig. 4), the devices will pass into their proper channel or magazine, and after passing through the same will be checked by an escapement device 6 (see Fig. 17). By the escapement device the controller devices are fed in their proper order to a wheel or rotary member 7 (see Fig. 16) and by the latter moved to the contacts of the index head (see Figs. 16 and 24). After the selecting devices have done their work at the index head to set the mold or the justifier, as the case may be, the member 7 continuing to rotate pushes them one after the other into the vertical channel 8 (see Figs. 2, 3 and 16), where each is engaged by a lifting device (see Fig. 20) and forced up the return channel 8. During this return movement, the collars or selecting means 9 (see Fig. 10) engage wedges 10 (see Fig. 3) and are forced by the wedges to their initial or zero settings on their shafts. On reaching the top of the channel 8, the controller members again pass down the channel 1 for another setting, and the same series of operations is repeated.

Having briefly outlined the operation of the machine, the same will now be described in detail.

Upon reference to the drawings it will be seen that the apparatus comprising the machine lies largely within the planes defined by the two side plates 11 and 12, which are held together at various points by bolts 13. On the interior of these side plates, guides 14, forming the various controller channels above referred to, are suitably mounted or attached. In the drawings these channels are shown as zigzag tracks attached to the inside of the plates 11 and 12, as by means of ears or lugs 15. Obviously, however, the construction or the precise shape of these tracks is immaterial; possibly, a mere zigzag slot in the plates might be made to answer the purpose.

The controller members (see Fig. 10) consist of shafts 16, having at either end a roller 18 to engage and have bearing on the tracks 14, as well as to engage certain other mechanisms hereinafter to be specified. On each controller shaft 16 are three collars or disks 19, movable in either direction to and from a central position on the shaft 16, but having sufficient frictional contact with the shaft to remain stationary when set, or unless positively acted upon by some setting or resetting device. The controller members pass by gravity down the channel 1, until the ends of their shafts 16, come into contact with the upper surfaces 20 of the stop noses 21 (see Figs. 10, 9, 4 and 2). The stops 21 are carried by levers 22, the hubs of which are fast to a shaft 23, which is pivoted at either end in the side plates 11 and 12. The levers 22 lie outside of the side plates 11 and 12, but these plates are slotted to permit the stops 21 and stops 24, the latter to be presently described, to lie within the plane of the inner faces of the plates 11 and 12, so as to intercept the path of the controller member shafts. One of the levers 22 is a bell-crank lever, the upper arm 25 of which carries a pin 26, which by engagement with the toothed wheel 27 (see Fig. 9), is rocked, and rocks the levers 22 to withdraw the stops 21 from the path of the controller members, and to release the latter one by one after the selectors 9 have been set. In order that but one controller member at a time may be released when the stop 21 is withdrawn from the path of the channel, the stops 24 are provided. These stops, together with the stops 21, form, in effect, an escapement mechanism more clearly shown in Fig. 9. The rollers 18 of each controller member support the controller member next above it in the channel, and serve to space the controller member shafts 16 at a slight distance each from the other. As the levers 22 are rocked, withdrawing the stops 21 from the controller member resting thereon, the stops 24 enter into the space between the shaft 16 and the controller member being released and the shaft 16 of the controller member immediately above, so that the latter controller falls upon the stops 24, when the preceding one is released. When the levers 22 return to their normal position, the stops 24 are withdrawn from the controller member resting thereon, and the latter then falls upon the stops 21, where it is held until its selectors have been set, whereupon it in turn is released. The lower surfaces 28 of the stops 24 are shaped to act as cams to force down the controller member below in event such controller member should by binding or frictional engagement remain stuck in the channel when the stops 21 are withdrawn to release it.

The toothed wheel 27 for operating the bell-crank lever arm 25, is actuated by the following means. As will hereinafter more fully appear in connection with a description of the circuits shown in Fig. 30, the character and justification keys on the composer's keyboard, when operated, close a circuit to energize a magnet 29, rocking the armature 30 thereof. This armature is pivoted at 31, and has an arm or extension 32, having at the lower end thereof a tooth or projection 33. Pivoted at 34, and normally held by a coil spring 35 in the position shown in Fig. 9, is a lever 36. Pivoted to the lower end of the lever 36 is a link 37 (see Figs. 2 and 4). The link 37, at its other end, is loosely pivoted to an arm or link 38, the arm or link 38 being in turn loosely pivoted to a shaft 39. Fast to the shaft 39 is a ratchet 40, and moving with the arm 38 is a pawl 41. Fast to the shaft 39 to which the ratchet wheel 40 is attached is the toothed wheel 27 heretofore mentioned, the teeth of which engage the pin 26 on the bell-crank lever 25 to rock the latter. Each time, therefore, that the magnet 29 is energized, the armature 30 is drawn in, forcing the arm 36, with the links 37 and 38, outward to a stop 36', and drawing the pawl 41 idly back over one of the teeth of the ratchet wheel 40, without turning the ratchet wheel or the wheel 27. As soon, however, as the magnet 29 is deënergized, the coil spring 35 forces the lever 36 inward to the position shown in Figs. 2 and 4, and the pawl 41 by engagement with one of the teeth of the ratchet wheel 40 rotates this wheel one step, finally coming to rest against a stop 42. As the wheel 40 is rotated, it turns the shaft 39 and the wheel 27 a corresponding distance, drawing one of the teeth 43 of the wheel 27 under the pin 26 of the lever 25, and rocking this lever as hereinbefore described, to withdraw the stops 21 from the path of the controller member resting thereon. A spring 44 bearing against a stop on the arm 25 (see Fig. 9), causes the pin 26 to bear against the wheel 27, and serves to return the stops 21 to the controller channel when permitted by the wheel 27.

The same operation of the operator's key which serves to energize the magnet 29, serves also to set the selector 9 (see Fig. 10) of the controller members. In order that this setting may be effected before the release of the controller member, it will be noted from the above description that the energization of the magnet 29, does not at once release the controller member, but that the controller member is released by the action of the spring 35 on the lever 36, not until the magnet 29 is deënergized. This delay between energization and deënergization of the magnet 29, allows for the setting of the selecting devices. These are set by the following means: Behind the channel for the controller members at a point of the latter directly behind the stops 21, are two rows of stops 45, (see Figs. 4, 6, 7 and 8), which lie parallel to the shafts 16 of the controller members. The stops when operated from the keyboard are moved so that their ends project into the path of the selecting devices 9, so that the devices 9, when moved along the shaft 16, in the proper direction, will engage and be arrested by their appropriate stops. Normally, however, the stops are held withdrawn from the path of the collars 9, as by means of coil compression springs 46 (see Fig. 6), one end of each of which lies in a pocket 47 in a frame member 51, and the other end of each of which bears against a pin 48, carried by each stop. When released to the action of their springs 46, the stops are forced rearward out of the path of the collars 9, and finally come to rest with their hooked ends 49, resting against the frame members 50 and 51. The frame members 50 and 51 serve also as guides for the stops 45. For compactness of structure, alternate stops 45 are in the upper row of stops and rest on top of the member 50, with their hooked ends depending downward, while the intermediate alternate stops are in the lower row and face the lower surface of the member 50, with their hooked ends turned upward (see Figs. 7 and 8). The member 50 has in its upper and lower surfaces a series of slots or ways in which the stops 45 have bearings. The distance between these slots in each surface is the width of the intermediate stop on the other surface, and the slots or ways in the two surfaces are staggered with respect to each other (see broken section of Fig. 8). The frame members 51 lock the stops 45 in their ways in the member 50, and bolts 52 hold the members 50 and 51 securely locked together. Bars 51' carried by the members 51 are slotted to receive the hooked ends 49 of the stops 45, and thereby serve as a further guide for the stops. The rear end of each stop 45 is hooked as at 53, to engage the rear face 54 of the member 50, so as to be stopped thereby in the forward movement of the stops into the path of the selecting devices 9. The stops are forced into the path of the selecting devices 9, by means of levers 55 (see Figs. 4 and 11), suitably pivoted in brackets 56, and operated from the armatures 57 of the selecting magnets 58 (see also Fig. 30). Whenever any of the magnets 58 are energized, the corresponding stops are forced into coöperative relation with the controller members; and when the magnets 58 are deënergized, the springs 47 return the stops to their normal position.

The stops 45 are operated by the magnets 58 and 62 either singly or in groups of two or three; according to the particular key operated at the character keyboard, for registering characters; or according to the particular justification key operated at the justification keyboard, for registering justifications. The system by which certain combinations of stops are made to represent certain characters or justifications, is substantially that explained in our co-pending application, No. 417,899, filed February 26, 1908. As will hereinafter appear in connection with a description of Fig. 30, the stop operating magnets 58 in the present application correspond to the magnets which in the invention of our aforesaid co-pending application operate the paper punches. Likewise, the connections from the character and justification keyboards to the magnets 58 are in the present case, in principle, substantially the same as the connections from the keyboards to the punch magnets of our former invention. Therefore, whenever any key on either the character or on the justification keyboard is operated, a combination of stops 45 is operated to reproduce on the controller member a setting representing the character or justification key operated.

The central of the selecting members 9 is for justification purposes only, and has a single definite movement whenever actuated. It is actuated whenever the justification calls for the operation in the casting machine of a shift or circuit changing mechanism (see Fig. 32) which in our aforesaid co-pending application was effected by the so-called row #13 magnet, and which has the purpose in the casting machine of reversing the order in which the selected mold stops are made to set the mold. This central selecting device, when moved, is moved on its shaft 16, by a lever 59. The lever 59 is pivoted at 60, to an extension 60′ of the frame member 51, and moves in a slot which extends through the frame member 50 (see Figs. 4 and 6). The lever 59 carries the armature 61 of a magnet 62. The circuits through which the magnet 62 is operated will be described in connection with Fig. 30. Suffice for the present to say, that it is operated whenever certain justifications are desired, which involve the operation of the shift or circuit changing device above referred to. This magnet when energized causes the lever 59 to move the central selecting disk 9 against its stop 63 (see Figs. 6 and 8). A spring 63′ returns the lever 59 when the magnet 62 is deënergized. The other two selecting devices 9 are moved each by one of a pair of dogs 64, carried respectively on ears or lugs 65, (see Fig. 6). The lugs 65 are carried each by a slide 66, movable in ways 67 (see Figs. 5 and 6). In order that the slide 66 may be moved with the lugs to force the selecting members 9 against the appropriate stops, each of the slides 66 is attached as at 68 to one of two levers 69. The levers 69 are pivoted at 70 to the frame of the machine and are actuated by links 71, which are pivotally connected thereto, and are connected also to the ends of bell-crank armature levers 72, the armatures 73 of which are actuated by the magnets 74. Coil springs 75 embrace the pivots 70 of the levers 69, and by engaging at one end of the levers, and at the other end anchorages 76, serve to return the levers 69, with the slides 66, when the magnets 74 are deënergized. The magnets 74 are larger than the stop magnets 58, and are more sluggish in their action. For this reason, although the circuits of the selected stop magnets 58 and of the magnets 74 are simultaneously closed by the operation of the character or justification key, as the case may be, yet, the stop magnets 58 being quicker in action than the magnets 74, project the proper stops 45 into the path of the selecting members 9, before the levers 69 operate to move the dogs 64. The stops are therefore set before the selectors 9 are moved by the dogs. It will be noted that the dogs are pivotally mounted to have a slight pivotal movement on the ears 65, and are controlled in this movement by springs 77 and stops 78 (see Fig. 6). This pivotal movement of the dogs 64 is necessary to permit the dogs to be returned to their initial position over the selecting devices 9 of the next succeeding controller member. The stops 78 hold the dogs against pivotal movement when they are setting the selectors 9.

We have to this point described the means by which the several controller members are arrested at the selecting apparatus, and there set and then released. This setting apparatus is common to the character and the justification controller devices.

We will now describe the means whereby the justification controllers, although last to be set in each line, or justified section thereof, may be the first to reach the operating contacts of the casting machine at the index head. In other words, we will describe the means whereby the character controllers, after they have left the setting apparatus, are delayed, until the justification controller member can be placed ahead of them to the index head.

In the present machine, as heretofore mentioned, there are two channels or magazines between the setting apparatus and the index head, through one of which the channel 2, the character controller members pass, and through the other of which, the channel 3, the justification controller members pass. Obviously, there must be some means, such as a switch, provided, whereby the justification channel 3 is closed to the character controller devices, and vice versa, the character channel closed to the justification controller devices. This switch and the means by which it is operated is shown in Figs. 2, 4, 13, 14 and 15. Referring to these figures, it will be seen that the switch or channel selector comprises a pair of arrow-shaped levers 80, having angular movement at the junction of the channels 2 and 3. In the position of these levers, shown in Fig. 4, the justification channel 3 is open, and the character channel 2, closed. The levers 80 are fixedly attached to a shaft 81 mounted in the frame members 11 and 12 (see Fig. 14), and are preferably secured to the shaft outside of the frame members. By means, however, of slots 82 in the frame members and a suitable off-set 83 in the levers 80, the latter are brought within the frame, and into proper position with respect to the channels. One of the levers is a bell-crank lever, having an arm 84, on the end of which is a pin 85, engaged in a yoke 86 on the end of a lever 87. The lever 87 is fast to a sleeve 87' having pivotal movement on a pin 88' to which sleeve is also fast a two-armed lever 88, carrying two armatures 89 and 90, controlled by magnets 91 and 92 respectively. When the magnet 91 is energized, the lever 87 assumes the position shown in Fig. 13, and when in such position the switch 80 controlled thereby closes the character channel and opens the justification channel. When, however, the magnet 92 is energized, the lever 88, and, consequently, the lever 87, are rocked to throw the switch 80 to its other position, closing the justification channel and opening the character channel. In order that the lever 80, in whichever position it may be thrown, may be held against displacement, except by the proper operation of the magnets, there protrudes from the pin 85, a small pin 93, which is pressed by a spring 94 against the frame member 12. In the frame member 12 are two small holes 95 and 96, each positioned to receive the pin 93 in one of the positions of the switch 80, and by virtue of the pressure of the spring 94, adapted to hold the lever 84 and the switch in place. The end of the pin 93, and the holes 95 and 96, are so shaped that the pin rides out of whichever hole it may be in, whenever the lever 87 is actuated by its proper magnet 91 or 92. The magnets 92 or 91 are energized whenever a character or a justification key is depressed, through certain circuits shown in Fig. 30, and to be hereafter described. The fact that the controller members are not released from the setting mechanism until the magnet 29 is deënergized allows ample time for the magnets 91 or 92 to set the switch before the latter is reached by the controller member so released.

The parts of the machine heretofore described are operated and controlled from the keyboards by the operator. The parts hereafter to be described, which relate to the control of the casting machine by the controller members are, for the most part, controlled directly or indirectly from the casting machine power shaft, and do not operate in synchrony with the operation of the keyboard keys. One of the stated purposes of the present invention is to make the control of the casting machine by the controller members largely independent of the operator, so that the operator may work several lines in advance of the casting and setting up of the type, or may, when the magazines are supplied, cease operating at will, while the casting machine continues to set up type. The casting machine being driven from a suitable power shaft ordinarily when operating works at a uniform speed, so long as controller members are fed to it; and it is the object of the present invention to have the casting machine take the controller members one after another from the magazines 2 or 3, at a uniform rate, as the type are set up.

The casting mechanism in connection with which the present invention is adapted to be used is preferably substantially like the casting machine described and claimed in our co-pending application, Serial Number 417,898, filed February 26, 1908, except in that the present machine is substantially integral with the composing machine, and instead of being operated from an index head by a tape controller, is operated by a controller of the character hereinbefore described. The circuits leading from the index head of the present machine differ only in a few minor respects, to be pointed out in connection with Figs. 31 and 32, from the circuits leading from the index head of the machine of our aforesaid co-pending application, Serial Number 417,898, and the parts operated by such circuits being in practically all respects like those of the aforesaid application, no illustration or description thereof is here necessary.

The make and break of the circuits of the contacts 100 at the index head (see Figs. 16, 22, 23 and 24) is controlled by a bank of levers 102. The contact strips as well as the levers 102 are arranged in two sets for convenience and compactness of structure, some of the contact strips being mounted on a block of insulating material 103, and the other contact strips being mounted upon an insulating block 104, both of said blocks being carried by a frame member 105. Some of the contact levers 102 are pivoted at 106, and the others at 107. Those levers pivoted at 107 operate the contacts on the block 103, and those levers pivoted at 106, operate the contacts on the block 104. Engaging the contact strips 100 are metal pins 108, from the upper set of contacts, and similar metal pins 109, from the lower set of contacts, leading respectively to branches 110 and 111 of the cable, which as seen in Fig. 1, are united and form a single cable 101, leading to the various setting magnets of the casting and justification mechanisms. The contact levers 102, pivoted at 107, are normally held in the position shown in Fig. 22, by means of spring pressed pins 112, and the contact levers pivoted at 106 are similarly held in the position shown in Fig. 22, by means of similar spring pressed pins 113. Stops 114 and 115 define the outward movement of the contact levers under the action of the spring pressed pins.

The controller members are carried into engagement with the contact levers 102 to rock the same, by means of the wheel or rotary member 7 consisting of two disks fast to a shaft 169 (see Fig. 12). The peripheries of the disks of the wheel 7 are grooved or toothed, as shown in Figs. 16 and 17, to receive the ends of the shafts 16 of the controller members. When the wheel is turned with the controller members, the selecting collars 9 of the latter are forced against certain of the contact levers 102, with which the selectors 9 may register (see Fig. 24); and the contact levers are thus rocked against the contact strips 100. The contact levers 102 which do not register with some one of the three selecting devices 9, on any particular controller member, are not moved by that controller member. According to which contact lever 102, or what combination of such contact levers is rocked, the casting machine is set, after the manner set forth in our aforesaid co-pending application, Serial Number 417,898.

Both of the channels or magazines 2 and 3 have their outlet at a point directly over the wheel 7, so that the foremost controller members in these channels, when free to do so, will fall upon the wheel 7. The feed of the controller members from the channels 2 and 3 to the wheel 7, must, however, be controlled to accord to the speed of the casting machine, and must also be controlled so that the feed is from the proper magazine. When one line of type has been set up and cast in the casting machine, the justification controller for the next line must be fed on to the wheel 7 from the magazine 3. Thereafter the feed of the character controllers for the line so justified must be from the magazine 2.

The means by which the feed of the wheel 7, and the feed of the controller members thereto, are effected, will now be described.

Fast to a shaft 116, which is pivotally mounted in a sleeve 116' attached to the frame members 11 and 12, are escapement devices 117, which lie on either side of the machine outside the frame members 11 and 12, but which are offset, as shown at 120 (see Figs. 1 and 21), to enter slots 121 (see Fig. 17), in the frame members 11 and 12, and which are further offset as represented by the two shelves 118 and 119 (see Fig. 21) to project across the mouth of the magazines 2 and 3. The offset 120 is substantially the width of the frame members 11 and 12, and the offset represented by the shelves 118 and 119, is of a width sufficient to receive and support the ends of the shafts 16 on the controller members. The shelves 118 in one angular position of the escapement devices 117 close the mouth of the magazine 2 and respectively support the two ends of the lowermost controller therein. The shelves 119, when in one angular position of the escapement devices 117, similarly close the magazine 3 of the justification controller members, and respectively support the ends of the lowermost controller member in this magazine. Upon movement of the escapement devices to the left, the character controller member supported on the shelves 118, is released and drops through the opening 122 onto the wheel 7. When, however, the escapement devices 117 are moved to the right, the shelves 119 withdraw from the path of the lowermost justification controller member, and release the same to the wheel 7. Between the shelves 118 and 119, are lugs 123, having lower surfaces curved down to a central point. The surfaces on either side of the central point act as cam surfaces, to force down the controller member which is to be released, in the event such controller member should become bound or stuck in the channel.

The escapement devices 117 are operated from a cam on the power shaft 291 of the casting machine, primarily by means of a rod 125 (see Fig. 35) (not shown in Fig. 1 because it is on the other side of the machine), which is reciprocated once upon each revolution of the cam on the power shaft. The rod 125 carries a collar 126 (see Figs. 17 and 18), having ears 127, between which is engaged the end of a lever 128, fast to a shaft 129, which is pivotally mounted in the frame members 11 and 12. Fast to the same shaft 129, but on the opposite side of the machine (see Figs. 1 and 17) is another arm 130, which engages a collar 131 on a shaft 132. The shaft 132 has a vertical reciprocating movement, and also has a swing or pivotal movement on the pivot 133, by which it is attached to the arm 130. On its lower end, the rod 132 carries a T, or cross piece 134, having a recess or pocket 135 in one end thereof, and a recess or pocket 136 at the other end thereof. Fast to one of the escapement devices 117, is a cross piece 137 (see Fig. 17), carrying at one end a pin 138, and at the other end a pin 139. The pins 138 and 139 are in the path of the pockets 135 and 136, respectively, of the T 134, on the lever 132, when the latter swings on its pivot 133; so that when the lever 132 is swung to the right of the vertical, as shown in Fig. 17, the pocket 136 engages the pin 139, and when swung to the left of the vertical, the pocket 135 engages the pin 138. According to which pin 138 or 139, is engaged by the T, on the rod 132, depends the direction in which the escapements 117 are rocked upon the upward movement of the rod 132 in response to the downward movement of the rod 125. If, as shown in Fig. 17, the pin 139 is engaged by the rod 132, then upon operation of the rod 125, the escapements are rocked to the right, withdrawing the shelves 119 from the mouth of the justification magazine and feeding justification controller to the wheel 7. If, on the other hand, the pin 138 is engaged by the lever 132, when the rod 125 operates, then the escapements are so rocked that the shelves 118, are withdrawn from the mouth of the character magazine, and a character controller thereby fed to the wheel 7. The lever 132 is rocked on its pivot 133, in one direction or the other, according, therefore, as to whether it is desired to feed a justification controller or a character controller to the wheel 7. If the line of composition (or in the event of multiple justification, a section of a line of composition) is finished, and it is necessary to set the casting machine for the justification of a line, or of a section of a line, then the lever 132 is rocked to the right, so that the escapement 117 is rocked to the right. After the justification has been set for the line, or a section of the line, then, and until another justification is required, the lever 132 is rocked to and stays in the left hand position, so that on each rise of the same, the character controllers will escape to the wheel 7.

The angular position of the lever 132 is controlled from means presently to be described, by electric circuits through the magnets 140 and 141. The armatures 142 and 143 of these magnets, are carried by a two-armed lever 144, which is fast to a sleeve 145 on a pivot 146. Fast to the sleeve 145 is a lever 147, forming, in effect, a bell-crank lever with the arms of the lever 144, so as to be rocked to the left or to the right, according to which of the magnets 140 or 141 is energized. The lever 147, at its outer end 148, engages a slide 150, movable in ways or bearings 151 and 152. The rod 132 which operates the escapement, passes through an opening 153 in the slide 150, and fits comparatively snugly in this opening, so that when the slide 150 is moved by the lever 147, the rod 132 will move with the slide and be rocked to the right or left on its pivot 133. The movement of the slide 150 is sufficient to withdraw the pocket 136 in the T 134 from the pin 139, and cause the pocket 135, in the T to receive the pin 138. The magnets 140 and 141, therefore, determine in which direction the escapement shall move for each operation of the rod 125 from the casting machine cam shaft.

After each oscillation of the escapement 117, it is returned to central position by one of two springs 154, each of which in one displacement of the escapement is adapted to bear on the underside of one arm of the cross-piece 137. In order, however, that the springs 154 in being thrown in or out of action may not throw the escapement back and forth over and beyond the central position and so release various controller members, a pair of stops 155 are provided, one on either side of the escapement. These stops have vertical movement in opposite directions. Their lower ends, when depressed, each engage and hold one of the springs 154 out of contact with the cross arm 134, so that the latter is acted upon by one only of the springs 154 at a time. These stops furthermore have surfaces 157 adapted to be lowered each into the path of one of two shoulders 158 on opposite ends of an upper cross-arm on one of the escapements (see Fig. 17). The shoulders 158 prevent the escapements from passing the central position when acted upon by the one spring 154, which at that time is engaging the same. The stops 155 operate according to the direction of movement of the slide 150. The slide 150 is cut near either end to have two cam surfaces 159 on its lower face. The stops 155 are extended into the slide bearings 151 and 152, and at the upper end of each stop is a cam surface 160, adapted to engage one of the cams 159 on the slide. A pair of springs 161 serve to hold the stops normally elevated. The cam surfaces 159 on the slide 150 as well as the cams 160 are reversely disposed so that when the slide moves in one direction, one of the stops 155 will be depressed by one of the cams 159, acting on one of the cams 160, and when the slide moves in the other direction the other stop will be similarly depressed by the engagement of the other cams, as the first slide is elevated by its spring. In Fig. 17, the stop at the right-hand side is shown as having been depressed by the cam 159 on that side of the slide, so that its surface 157 lies in the path of the right-hand shoulder 158 of the escapement. It will be noted, however, that the stop on the other side has been lifted by its spring 161 into the recess formed in the slide by the left-hand cam 159, so that the stop surface 157 on that side is removed from the path of the left-hand shoulder 158 of the escapement device 117. The escapement device is, therefore, free to rock in one direction whenever the lever 132 reciprocates, but is prevented from movement beyond its central position in the other direction. By means, therefore, of one of the springs 154, and of one of the stops 157, the escapement is always returned to center and there stopped, when released from the action of the rod 132.

The means by which the magnets 140 and 141 are energized to operate the slide 150 will now be described.

The wheel 7 is given a step by step movement each time the rod 125 repicrocates under the action of the cam on the power shaft of the casting machine. To effect this feed of the wheel 7, the rod 125 has fixed to it a second collar 165, having ears 166, which engage the end 167 of a lever 168. The lever 168 is loosely pivoted to the shaft 169 which carries the wheel 7. Fast to the shaft 169 is a ratchet wheel 170, and, carried by the lever 168, is a pawl 171, adapted to engage the ratchet wheel 170, and to turn the same one step upon each reciprocation of the rod 125. When, therefore, the controller members are received by the wheel 7, they are moved by the latter step by step toward the levers 102 of the index head. It will be noted from Fig. 16 that several such movements are required to bring the controller members to the levers.

The first operation in setting up regular matter is to set a trip controller; and then, to set successively, the character controllers for the first line. The trip controller has the function ascribed to the trip hole in the tape controller of our co-pending application, Serial Number 417,899. The function of this trip is to operate in the casting machine a shift switch which is adapted to connect to the index head either the "working" circuits for setting the mold and matrix to cast characters, or the "setting" circuits for setting the justifier and certain other parts at the beginning of each line so that the line may be justified as cast and set up. The trip controller and the character controllers are collected in the character channel in exactly the order in which they have been set. The next operation is to set a justification controller. This setting is accomplished by touching with one finger, the key on the justification keyboard, the number of which corresponds to the number of units shortage indicated by the unit register; and, while this key is held depressed, to touch also a key denominated "J. K. B. In.," Fig. 30, the function of which latter key will presently be described. These two operations combined, serve to set a justification controller, and to send it into the justification channel 3. This completes the setting up of the first line. The second, and all succeeding lines are set up in exactly the same manner. The trip key which is struck at the beginning of each line serves, besides setting a trip controller, to open the character channel for the trip controller itself, and for all the character controllers following it in that particular line. It is obvious that a repetition of this cycle of operations will cause controllers to be set and fed to the magazine channels as follows: (1) In the character channel,—a trip controller, followed by a number of character and word space controllers; then another trip controller followed by a number of character and space controllers,—and so on up to the capacity of the magazine. (2) In the justification channel,—a number of justification controllers. This number of justification controllers will be equal to the number of completed lines, or completed justified sections thereof, represented by the groups of character and trip controllers stored in the character channel. As will be hereinafter described, first, the "Line cancel" controllers, that is to say, the controllers which effect the cancellation of a spoiled or undesired line, and the "Multiple justification" controllers, that is to say, the controllers which are used where there are lines with several justified sections, are for all intents and purposes so far as channel assignment is concerned, justification controllers, and are treated exactly as such, the only difference being that these controllers have to do, first, with a portion of an unfinished canceled line, and, secondly, with the completion of a line made up of several separately justified portions. After the controllers have been set, segregated and deposited into their proper channels, as just described, they themselves, automatically control all the electric circuits necessary for the performance of the duties of the casting machine. In turn they are controlled only by such mechanisms as are directly operated by the casting machine power shaft. By mechanisms hereinafter to be described, each controller is fed into the index head of the casting machine, to perform exactly the same functions as were performed by the paper tape described in our previous application, Serial Number 417,898.

Though the controllers are segregated into two groups, one group in each channel, they must be properly combined at the wheel 7 into a continuous succession of controllers moving to the index head, each in its proper place in this succession. That is to say, after each trip controller there must be a justification controller, and after each justification controller, there must follow the character controllers for that line of composition, the justification of which is to be controlled by it. When this arrangement is accomplished, the succession or chain of controllers will perform exactly the same functions as that of the tape described in our previous application, Serial Number 417,898. Two separate mechanisms necessary for the accomplishment of this object will be more clearly understood if they are considered separately. They may be designated as (A) the mechanisms which cause the controllers to be fed, one by one, out of one or the other of the magazine channels as required to be placed on the wheel 7 in a continuous succession, and in proper order. (B) the mechanisms which, if there be a break in the succession of the controllers, occurring immediately after a trip controller, allows, firstly, that trip controller, and necessarily also the character controller preceding it, to pass through the index head of the casting machine, and to perform all their proper functions, except; that the trip controller sets, but does not close, the contact for the circuit to the trip magnet which controls the shift switch of the casting machine; and secondly, which closes the circuit of the trip when, and not until, a justification controller does follow the trip controller, and then only when this justification controller has reached, during its step by step passage toward the index head, the proper position with respect to the index head position to close the contact for the circuit to the trip magnet.

Considering the mechanisms A and B in order:—

(A) This mechanism comprises the contact levers 185 and 192; the contacts 188 and 194; the magnets 141 and 140, whose circuits are controlled respectively by these contact levers and contacts; and the mechanism heretofore described which operates the escapement device 117, and is controlled by the magnets 141 and 140. The action of these parts may be briefly described as follows:—The first controller for any composed matter to be allowed to escape from its magazine to the wheel 7 must be a trip controller, because the mechanism controlling the escapement device, as will presently appear, is of necessity so set that the first escapement of a controller takes place from the character channel 2; and the trip controller is the first or lowest one in that channel. The release of the trip controller from the magazine 2 occurs upon the upward movement of the rod 132; that is, during the downward movement of the cam rod 125. During the downward movement of this rod 132, the wheel 7 is turned one division, and thereby moves the individual contact collar 9 of the trip controller under the end 191 of the lever 185, so that this lever is moved to close the electrical contact 188 for the circuit to the justification channel outlet magnet 141. At this time there occurs a dwell in the action of all those mechanisms operated directly from the index cam on the casting machine power shaft. The timing of the rise, dwell, fall, and dwell of these mechanisms is determined by the design of the aforesaid index cam. During the dwell, a commutator attached to the casting machine power shaft (see our co-pending application, Serial Number 417,898), causes a current to pass through the magnet 141, and the energization of this magnet causes the members of the escapement mechanism to assume the positions shown in Fig. 17, such that the next upward movement of the rod 132 will effect the release of a justification controller from the justification channel into that notch of the wheel 7, which just succeeds the notch in which the trip controller is located. During the next downward movement of the rod 132, the wheel 7 advances one more division, and thereby removes the trip controller from under the lever-end 191, thus allowing the lever 185 to break the contact 188 for the circuit to the magnet 141. This advance of the wheel 7 also brings the justification controller under the end 195 of the lever 192, to cause the individual sliding selecting device or collar 9 of the latter to rock the lever 192 to close the contact 194 of the circuit to the character channel outlet magnet 140. The end 195 of the lever 192 is made sufficiently long to be acted upon by the individual sliding collar 9, in whatever possible position that collar may be set on any controller, except a trip controller. That is, the individual collar 9 may be in any one of 15 positions—Ind. 0 to Ind. 14, inclusive, but not in position #15, which latter is the trip position. After the contact 194 of the magnet 140 has been closed by the lever 192, there again occurs a dwell in the action of all the mechanisms operated directly from the index cam of the casting machine power shaft; and during this dwell the commutator permits a current to pass through the magnet 140 to cause the various parts of the escapement mechanism to assume positions, such that, upon the next upward movement of the rod 132, the release of a controller from the character channel will take place. Obviously, thereafter the escapement device will release a character controller from the channel 2 for each revolution of the casting machine power shaft, until finally the trip controller in that channel for the beginning of the next line is in turn released and makes the contact to again set the escapement mechanism to the position shown in Fig. 17, whereupon the above cycle of operations is repeated.

It is to be understood that while those controllers which have just entered the wheel 7 are determining, as just described, in what order the controllers in the channels shall follow one another onto the wheel 7, those controllers previously on the wheel are being advanced step by step to and past the index head, and are performing their proper functions there. It can readily be seen that if there happens to be a break in the succession of the controllers released from the character channel 2 to the wheel 7, so that there are one or more notches in the wheel 7, not carrying character controllers, the effect upon the casting machine is simply one or more unproductive revolutions of that machine, and in no wise is the length of the line of type or its justification at all affected. It is also obvious that if, for some reason, there should be no justification controller in its channel ready to take its place in the wheel 7 just behind the trip controller, then no escapement of character controllers can be fed to the wheel 7 until the delayed justification controller finally reaches the wheel 7 and acts upon the contact lever 192 to set the escapement mechanism to the position shown in Fig. 17.

(B) The second mechanism comprises certain levers, push rods, etc. which control the action of a lever 199 (Fig. 27), which closes the circuit of the trip magnet. It is to be understood that this last mechanism would be entirely unnecessary were it not possible that the circumstance might arise in which the justification controller for a line which, next to be fed into the wheel 7, is not ready for that line, that is, has not yet been set, because the operator has not yet finished the line. In this event, supposing that a trip controller has been fed into the wheel 7, and has been advanced to the position where it acts upon the contact lever 185 to set the magazine escapement mechanism in the position shown in Fig. 17, and that the trip controller has been advanced step by step to the position where it acts upon its index head contact lever 102, with no justification controller immediately following it. Obviously, if the trip controller were then allowed actually to close its contact at the index head to send a current to the casting machine trip magnet, then the action of that magnet would set into operation the justification mechanism directly connected to the justification cam. As set forth in our copending application, Serial Number 417,898, one revolution of the cam, which sets the justifier requires two revolutions of the power shaft for its accomplishment. Furthermore, when this cam is set into action, it is clutched to the power shaft, and its revolution is of necessity coincident with the two consecutive revolutions of that shaft. Obviously, therefore, this cam must not be set into operation unless, first, the trip controller in the index head position is immediately followed by a justification controller; or, secondly, unless the trip controller is allowed to pass the index head position without actually making a contact to send a current into the trip magnet, but in so doing, nevertheless, sets some mechanism to permit a current to be sent to the trip magnet, when, and not until a justification controller has entered the wheel 7, and has been moved along step by step to that position which it would have occupied with reference to the trip controller had it immediately followed the trip controller while the latter was at the index head position. There being twenty positions on the wheel 7, if we number these positions from 0 to 19 inclusive, then that position into which the controllers are first allowed to fall from the channels is the #0 position. That position from which the controllers operate the escapement for the following controllers is the #1 position. That designated as the "Index head position" is the #5 position. That position in which the justification controller must be, in order to close the circuit of the trip magnet, is the #4 position.

In our previous application, Serial Number 417,898, it has been explained why that portion of the tape or controller having to do with the setting of the casting machine mechanism for the justification of the following line of composition, must be in the index head position during the second of those two revolutions of the power shaft required to operate the justification cam and the mechanisms connected therewith. The same reasons hold in the present case. If the justification controller should happen not to be in the index head, i. e., #5 position during the proper revolution of the casting machine power shaft, it cannot perform its proper functions; and when this controller does reach the index head position at some subsequent revolution of this shaft, it would not only not perform its proper functions for the justification of the line, but it would perform a function improper for it. It would cause some character to be cast, to wit, the character, the location of which on the matrix corresponds to the settings of the Row and Ind. sliding collars upon this justification controller. It would do this at such a time because all those mechanisms of the casting machine which act to set the justification mechanism would then be out of operation, and all those mechanisms which have to do with the casting of characters would be in operation. The object of the mechanism now to be described, is to control the mode and the time of the action of the justification controller upon the casting machine in the event of that controller not following the trip controller immediately. The mechanism for the accomplishment of this object, is best shown in Figs. 25, 27, 28, and 29. The rod 210 is fitted with an end 210′ having a cam surface 210″ thereon, normally held in the path of the roller 18 on the Ind. side of the controllers 16. The end 210' is so located that it will be acted upon by the roller 18 of any controller moved into position #4 above mentioned. This rod 210, when moved by a controller, engages a lever 203. A rod 206 similarly engaging a lever 202 is acted upon by the Ind. selector collar moved to its final #15 or trip position on the controller. Only trip controllers can, therefore, operate the rod 206. The trip controller acts upon the rod 206 when in its #5 or index head position on the wheel 7. This mechanism operates variously according to the following conditions:

Case (1): When normal conditions prevail,—i. e., when a trip controller is in position #5 followed immediately by a justification controller in position #4,—both levers 203 and 202 are held away from contact lever 199, and allow a spring 201, to move the lever 199 to an electrical contact 198 to close the circuit of the trip magnet of the casting machine.

Case (2): When the trip controller is in position #5 and is not followed immediately by a justification controller in position #4, the lever 199 cannot reach the contact 198 to send a current to the trip magnet because of the lever 202, but the parts of the mechanism will be so set by the trip controller, that—

Case (3): When the justification controller is brought into the position #4, it then removes the lever 202 from the lever 199, so that the latter may operate to close the circuit of the trip magnet.

The normal relative positions of the parts are as in Fig. 27. The lever 203 is held by the dog 211 away from the lever 199. The lever 202 is not so held by its dog 208, but is held against the lever 199 by the action of its spring 212. The lever 199 is, therefore, held from its contact 198. The two dogs 211 and 208 are fast to each other and form one piece with the arm 215. The jaw of the dog 208 is in advance of the jaw of the dog 211 (as shown in Fig. 27). The lever 203 has a lug 219 adapted to be engaged by the jaw of a swinging pawl 213 when that pawl, by reason of the angular movement of the arm 215, on the end of which the pawl swings, has had its jaw brought sufficiently forward to engage the lug 219.

The action of this mechanism in Case (1) seems obvious; but, if not so, it will be better understood after the consideration of Case (2) and Case (3), because Case (1) is really a combination of the other two.

The action of the mechanism in Case (2) is as follows:—Since the normal relative positions of the members of the mechanism are as above described, a trip controller in being moved from position #4 to position #5 in the wheel 7, acts to push the lever 202, so that its end will be caught by the jaw of the dog 208. In this movement of the dog 208, the end of the lever 203 is released from the jaw of its dog 211. (It might be mentioned here that while this action is taking place, the electric current to the inlet 199 is further broken by the commutator on the casting machine power shaft, so that even though there were a momentary contact between the lever 199 and the contact spring 198, no current could pass.) The lever 199 is now held away from its contact 198 by the lever 203, and not as before by the lever 202. The movement of the dog 208 has caused a pawl 213 on the arm 215 to be brought forward sufficiently to enable it to engage a lug 219 of the lever 203 as soon as the latter is again acted upon by the rod 210. The parts are left in these positions until a justification controller is brought to the position #4 on the wheel 7, no matter how many revolutions of the casting machine power shaft may occur in the meanwhile.

The action of the mechanism in Case (3) is as follows: When with the parts in the above position the justification controller is brought to the position #4 on the wheel 7, its roller 18 acts upon the rod 210 to move the lever 203 again away from the contact lever 199. Lever 202 is now held by its dog 208 and lever 203 by the justification controller roller. The lever 199 is, therefore, free to be moved by its spring 201 against the contact spring 198, whereupon as soon as the commutator allows, a current passes to the trip magnet of the casting machine. At this time the lug 219 of the lever 203 is caught by the jaw of the pawl 213. As soon now as the justification controller is moved from position #4 to position #5 (or index head position) of the wheel 7, the spring 212 acts upon the lever 203, overcomes the spring on the dog member, and since the lug 219 of the lever 203 is caught by the jaw of the pawl 213 this pawl is pulled forward, thereby rocking the dog member and releasing the lever 202 from its dog 208. The lever 203 is itself released from the grip of the pawl 213 by a pin 217, on the frame of the mechanism, acting upon a cam surface 216 on the pawl 213, thereby sliding the jaw of the pawl 213 off the lug 219. When this has happened, both levers 203 and 202 act upon the lever 199 to hold it away from the contact 198. It is obvious that all parts will again assume their normal or set positions (as shown in Fig. 27) when the roller 18 of the very next controller reaches position #4 on the wheel 7, and acts upon the rod 210. Thereafter and until the next trip controller arrives at position #5, the rod 210 is out of the path of the rollers 18 of the succeeding controllers, and wear on the latter is avoided.

It is also apparent that the justification controller now in position #5 (index head position) is in that position at the proper time to perform its function of setting the justifier. In other words, it is in the index head position during the latter half of the revolution of the justification cam of the casting machine. The controller members on leaving the contact strips 102 continue to be turned by the wheel 7, step by step, until they reach the vertical return channel 8 of the machine by way of which they are returned to the top of the machine for another setting. The rotation of the wheel 7 forces the controller members far enough up the return channel to be within reach of a lifting device, also operated from the reciprocating shaft 125. This device consists of a pair of arms 175, fast to a shaft 176, which is pivoted to the frame of the machine (see Figs. 12, 16 and 18). Loosely pivoted to the end of one of the arms 175 is a link 177. The link 177 carries a lug 178, which lies in the path of the reciprocating lever 168, heretofore mentioned. Every time the lever 168 turns the ratchet wheel 170, it also comes into contact with the lug 178 on the link 177, raising the same, and with it the levers 175. A pin 179 on the lever 168 engages a slot 180 in the link 177, and thus serves as a loose connection between these two members. The lifting effort, however, is assumed by the lug 178, and not by the pin 179. The lever 175 carries a tooth or pawl 181, which is normally pressed outward by a spring 182, and which when in such outward position intercepts the path of movement up the channel 8 of the shafts 16 of the controller members. The shaft 16 of one of the lever controller members, resting on top of the member 181, is lifted, and with it all of the controller members above it, every time the shaft 125 is reciprocated. The spring 182 permits the tooth or pawl 181, the undersurface of which is cam-shaped, as indicated at 183, to snap back over the shaft of the controller member lying next below it, each time the rod 125 and link 168 are lowered for the next feed. A stationary spring pawl 184 (see Fig. 16) holds the controllers in the position to which they have been lifted by the pawl 181.

A résumé of the operation of the machine will now be given in connection with a description of the wiring, or system of electrical circuits, by which the various magnets are controlled, from the keyboards or from the power shaft as the case may be. Such of the circuits as are controlled from the keyboards are shown in Figs. 30 and 31, which together comprise a single chart. Those circuits controlled from the power shaft or from the controller elements are shown in Fig. 32. We will first consider Figs. 30 and 31.

Referring to Fig. 31, we find the magnet 29 which, it will be recalled, operates the stops 21 and 24 of the escapement device for arresting the successive controller elements that the same may be set, and for feeding them, when set, on to the magazines. Also, arranged in two semi-circles, are shown the magnets 58, which operate the selector stops for right and left contact collars 9, and the magnet 62, which operates the lever to throw the central contact collar 9 when the justification circuit changer is to be operated. The magnets 74 and 74' (Fig. 31) are the magnets which operate the dogs to throw the contact collars to the selected stops; and the magnets 91 and 92 (Fig. 31) are the magnets which control the switch 80 for determining to which magazine the controller is to pass.

Referring now to Fig. 30, the character keyboard is diagrammatically indicated at 225, and one character key 226 and other special keys to be presently discussed as shown thereon. The justification keyboard is indicated at 227 represented by one justification key 228. The contact drum is indicated at 229. The drum, its functions and movements are all set forth in our co-pending application, Serial Number 417,899. The switch for changing the keyboard connections with change of layouts is shown at 230, and the switch for changing unit values of characters in the layouts is shown at 231. The unit register stop magnets 232 and king magnet 233, the line signal 234, the indicator lock magnet 235 and release magnet 236, and other features, are set forth in our aforesaid co-pending application, Serial Number 417,899, and are herein indicated in Fig. 30. A few changes have been made in the wiring of our aforesaid application, Serial Number 417,899, and for this reason we will retrace the various circuits. The current enters the machine at the terminal 237 and passes by the wire 238 to the point 239, and then by a branch wire 240 to a contact 241 on the keyboard. It will be recalled that every time any character key on the keyboard is depressed the contact 242 is operated and engages the contact 241 and leads the current into the keyboard frame by a line 243. The character key 226 is shown as having two terminals adapted to close two circuits when operated. One of these circuits 244 leads to the switch 230, then to the Ind. #8 terminal at the rear of the keyboard whence it passes on to the Ind. #8 stop magnet 58, (see Fig. 31), thence to the Ind. king magnet 74, and thence to the common return 245 whence it ultimately passes from the machine by the negative terminal 246, Fig. 30. The circuit just described therefore operates the proper Ind. setting stop and the king magnet which causes the dog to move the Ind. contact collar 9 against that stop. The other circuit closed by the operation of the character key 226 may be traced as follows:—From the character key this circuit 247 leads to the switch 230, from the switch 230 to row contact #2 at the back of the keyboard, whence it passes to the row magnet #2, (see Fig. 31,) thence returning onto Fig. 30 to the switch 231 where its unit value is determined as 8 unit, from the switch 231 to the #8 magnet of the unit register, back again to Fig. 31 through the row king magnet 74', and then joining the line 244 from the Ind. king magnet the current passes to the common return 245. The key being operated, the contacts 241 and 242 close to let the current into the keyboard frame. When these contacts are closed a current also passes from the inlet line 240 to a line 248 which leads from the contact 242 and which passes to and through the relay magnets 249 and 250, energizing both of these magnets, and passing thence to the common return 245 and the negative terminal 246. From the inlet line 240 at the point 251 a branch wire 252 leads to the point 253, and at the latter point again branches through two circuits, each of which is controlled by one of the armatures of the relay magnets. One of these circuits 254 leads through the armature of the relay magnet 250, and when the latter magnet is energized so that this circuit is closed, the current passes through the line 254 on to Fig. 31 to the character channel magnet 92, thence to the magnet 29 and from the latter to the common return 245. This circuit, therefore, in operating the character channel magnet 92 throws the switch 80 so that the character controller, represented by the key 226, passes into the character magazine. It also operates the magnet 29 which releases the character controller from the stop 21 after the contact collars have been set. The release of the controller from the stop 21 occurs after the switch 80 has been set, as has been heretofore pointed out. From the point 253, the other branch of the circuit 252 passes through the armature of the relay magnet 249 and by the line 255 passes to the unit register king magnet 233 which throws the dial finger the amount fixed by the particular unit stop magnet 232 which has been actuated through the line 247 by the character key 226. From the king magnet 233 the line 255 passes to the common return and through the latter leads to the terminal 246. At the switch 231 the circuit 255 has branches, one line 256 thereof leading to the magnet 235 which locks the unit register after each feed of the indicator. From the magnet 235 the line 256 leads to the common return and thence to the terminal 246. We have therefore found that upon the operation of any character key the selecting stops controlled by the magnets 58 are set, the magnets 74 and 74' energized, the feed and character channel magnet operated, the unit register stop set and the unit register king magnet operated, and the dial lock magnet operated.

On the character keyboard is a space key 258 which, when operated, closes two circuits. One of these circuits 259 leads through to the Ind. 8 contact back of the keyboard, and then follows the line 244, heretofore described, through the #8 Ind. stop magnet 58, through the Ind. king magnet 74 and to the common return. The space key operates #8 Ind. simply because this is the position arbitrarily assigned to the space on the matrix block of the casting machine. The other line 260 from the space key leads to a contact marked SP+, then on to the justification keyboard "SP" magnet, and thence from a terminal marked SP— to a 4 unit contact at the switch 231, whence this line passes to the 4 unit stop magnet of the unit register and thereafter to the row king magnet 74', and to the common return. The mechanical action of the space key closes circuits to the feed magnet 29 and the character channel magnet 92, so that, upon operation of the space key, the normal space of four units is registered on the unit dial, the feed is operated and the space controller member is fed into the character channel or magazine. The complete space key circuits have not been shown as they are not deemed necessary to an understanding of the operation of this key. The key also closes the circuits of the relay magnets 249 and 250 above described. There is also on the keyboard a special "feed" key. The current is supplied to this key through a branch 261 from the point 239 of the feed wire 238. From the feed key the circuit is continued through the line 262 to the character channel magnet 92, and from the latter to the feed magnet 29, and thence to the common return; so that, when the feed key is operated, blank or unset controllers may be fed down the character channel.

The justification, as heretofore stated, is set from the key 228 on the justification keyboard 227. The current is let into the justification keyboard frame, when the proper justification key has been depressed, by means of a justification keyboard inlet key marked J. K. B. In. on the character keyboard. When the J. K. B. In. key is depressed a current from the line 261 passes to the line 263 and thence to the justification keyboard 227. When, then, one of the justification keys 228 is depressed three possible circuits are established. One of these circuits 264 leads from the drum 229 to one of the row terminals at the back of the keyboard and thence by the line 247 (in the event the justification key calls for a #2 setting on the row side) to the #2 row stop magnet 58, and thence to unit stop magnet #8, thence to the row king magnet 74', and thence ultimately to the common return. Another one of the lines from the drum 237, a line 265, leads to one of the Ind. contacts at the rear of the keyboard (in this instance the #8 Ind.), and thence by the line 244 to the #8 Ind. stop magnet 58, and through the Ind. king magnet 74 to the common return. The intermediate of the three circuits from the drum 229, namely the circuit 270, leads to the shift magnet 62 in Fig. 31, which, it will be remembered, operates the central of the contact collars 9. When the J. K. B. In. key is operated to establish a current to the justification keyboard it also establishes a current through a line 271 which branches from the line 263 and which leads to the justification channel magnet 91, thence returning by the line 254 to the feed magnet 29 and to the common return. When, therefore, the J. K. B. In. and justification keys 228 are operated one or two stop magnets 58 and possibly the shift magnet 62 are energized, according to the contacts on the drum 229, and at the same time the appropriate king magnets, the justification channel magnet and the feed magnet are operated. After the operation of the justification key the next key operated is the "trip" key. This key is the last key operated in the line or it may be said to be the first key operated for the succeeding line. The trip key is shown on the character keyboard. When operated, the current from the line 261 passes to two other lines. One of these lines 272 joins the line 262 and ultimately the line 254, thence passing to the character channel magnet 92 and from the latter to the feed magnet 29, and thence to the common return. The other of the lines 273 passes to the Ind. king magnet 74, thence to the common return. In other words, when the trip key is depressed the Ind. king magnet is operated to throw the Ind. contact collar 9 to the extreme position on that side of the controller member, and the character channel and feed magnets are operated to feed the trip controller into the character magazine.

At the end of every line the key 274 at the justification drum is operated. The operation of this key effects several results. Referring to Fig. 30, it will be seen that the key 274 carries three contacts, and is itself connected to a line 275 which joins the inlet wire 240 to take the current from the latter. One of the contacts carried by the key 274 is adapted, upon the operation of the key, to close the circuit through a line 276 which joins the line 273 from the trip key, heretofore described, to operate the Ind. king magnet 74. Another of the contacts on the key 274 is adapted to close a line 277 which joins the line 262 from the feed key, and by way of the line 254 leads to the character channel magnet 92 and feed magnet 29. The circuits of the trip key are, therefore, both closed by the key 274 and the trip controller may be set and fed from either the trip key or the key 274. The third of the contacts from the key 274 is adapted to close a circuit 278 which leads to the release magnet 236. This latter magnet, when operated, causes the unit register dial finger to be returned to its zero or initial setting. When, as at the end of a line, the justification drum is desired to be returned, the trip is operated by the key 274 and not by the trip key on the character keyboard. When, however, it is desired to operate the trip without returning the drum, as where multiple justification is employed, the trip key on the character keyboard is used.

Thus far, our present invention has been described with regard only to its adaptability for controlling the operations of the casting machine for the casting and justification of ordinary composition, i. e., composition wherein each line requires but one justification. Our present invention is also applicable for controlling the casting and justification of matter wherein sections of the lines are separately justified. When multiple justifications are called for, the multiple justification key on the character keyboard is operated. This key is adapted to close the branch 271 of the circuit 263, which latter operates the justification channel magnet 91 and the feed magnet 29. The multiple justification key also closes a circuit through a line 279, which includes the individual #14 magnet 58 and the individual king magnet 74.

The operation of the casting machine for casting and justifying such composition has been explained in our co-pending application, Serial Number 417,898. Therefore, it is considered sufficient that the present application contain a description only of the setting and segregating of the controllers for such composition; and of the feeding of the controllers through the index head in their proper order to perform the same functions as were performed by the paper tape controller described in our previous application under the heading of "Multiple justification."

It has hereinbefore been shown that the controllers for any line of ordinary composition are set by the keyboard operator, in the following order,—(A), trip controller: (B), character controllers and space controllers: and (C), justification controller. In the multiple justified matter, each separately justified section of a line is treated by the keyboard operator in exactly the manner above described; except that at the end of each completed line, and before the beginning of the next line, the operator must set two additional controllers, to wit, another trip controller, and a multiple justification controller. It is advisable for the purpose of delivering into the galley any matter which may be in the type channel, to set these two special controllers at the beginning of the composition of any multiple justified matter.

Fig. 33 represents diagrammatically the controllers for one complete line composed of two separately justified sections, and also those for one section of a following line of multiple justification composition,—all set, segregated and deposited into their proper channels. In this figure the numerals (1), (2), etc., denote the order in which these controllers have been set by the keyboard operator; C. H. denotes the character controllers; S. P., the space controllers; "Trip", the trip controllers; "Mult. just.", the multiple justification controllers; and "Just." the justification controllers. An examination of the diagram discloses that all those controllers which have to do with justification have been deposited in the justification channel, and, that all the remaining controllers have been deposited in the character channel. Applying now to this diagram, the principles of operation of the mechanism, hereinbefore described, which determines the order in which the controllers are fed, one by one, out of one or the other of the magazine channels as required and placed in their proper order on the wheel 7,—it will be seen that the controllers of Fig. 33 will pass onto the wheel 7 and to the index head in the order represented in Fig. 34.

Though our co-pending application Serial Number 417,898, describes the control of the casting machine for multiple justification composition, the repetition of the same in a very general way may be of value here. Since the order of the controllers in passing through the index head is as shown in Fig. 34; the Trip (1) will trip the justification cam to draw up the justification slide: the Mult. just. (2), will operate the magnet 491 (see Fig. 32) so that when Trip (3) causes the justification cam to be tripped again, the "Justification" slide and the "End of line" slide will be drawn up as one slide, and thus perform the functions of operating those mechanisms which act to deliver a line of type from the type channel into the galley: Just. (4) then follows to set the justification mechanism for the justification of that section of the line whose controllers (4), (5), (6), etc., will next pass through the index head: Trip (15) then trips the justification cam to operate the justification slide, etc., so that Just. (38) will set the justification mechanism for the justification of that section of the line whose controllers follow. It will be seen that the combination of "Trip & mult. just." occurs only when a finished line is to be delivered into the galley or when it is desired to operate the mechanism for doing this. It has been shown in our co-pending application Serial Number 417,898 that the combination "Trip & mult. just." is not necessary for the delivery of lines of ordinary composition into the galley,—because, before casting such composition, the "Justification slide" and the "End of line slide" are locked together manually, so that until unlocked manually, they will act as one slide, and will perform the functions of both slides.

The only key on the character keyboard of Fig. 30, not thus far described, is the line cancel key. This key, as is explained in our co-pending applications, Serial Numbers 417,898 and 417,899, is operated when, because of an error, or, for some other reason, it is desired to cancel a line, or so much of the line as may have been written. The operation of this key closes the following circuits:—It closes the circuit 271, which operates the justification channel magnet 91 and feed magnet 29. In addition it closes a circuit 280, which includes the row #14 stop magnet 58. The controller setting, determined by the operation of the row #14 stop magnet, is for the purpose of operating the line cancel magnet 698 (see Fig. 32), which is similarly designated in our co-pending application Serial Number 417,898, and which, as there explained, serves to break the working circuit of the casting machine, so that the pump and other mechanisms will cease operating while the line to be canceled passes through the machine. When the operator wishes to cancel a line or part of a line (for which naturally the controllers will have already been set, segregated, and deposited into their proper channels) he touches the line cancel key. Then he touches the trip key; this latter action being the first operation for the composing of a new line to take the place of that just canceled. He then proceeds with this new line in the usual manner.

As has been previously stated: the "Line cancel" controller is for all intents and purposes, a justification controller and is treated as such in its passage from the setting position to and through the index head. As shown in Fig. 32, and as explained in our aforesaid application, this line cancel magnet 698 is on the setting side of the casting machine, and cannot be energized, until the circuit changing switch, operated by the trip, has been thrown. Therefore, the line cancel controller is fed from the setting position into the justification magazine 3; and to this end, the line cancel key has the connections, heretofore described, to the justification channel magnet 91. Since, as stated, the switch must be thrown, the trip controller passes through the index head ahead of the line cancel controller.

The circuit chart, shown in Fig. 32, is substantially the same as the chart shown in Fig. 7 of our co-pending application, Serial Number 417,898, the only changes being the changed connections of the magnet 491, which is operated by the multiple justification controller, and the addition of the circuits of the magnets 140 and 141, which are operated from the justification and trip controllers, respectively, to control the feed from the magazines to the wheel 7. The magnet 678 in the casting machine diagram of Fig. 32, is the magnet which is energized by the central contact collar 9, when the latter is set by the magnet 62 (see Fig. 31). The magnet 678, when operated, has the function of reversing the normal position of the circuit changer 666, indicated in Fig. 32, the function of which is fully explained in connection with Figs. 85 and 112 of our co-pending application, Serial Number 417,898.

Having set forth the objects and nature of the invention, and described in detail a complete embodiment of the same, what we claim and desire to secure by Letters Patent is:

1. In a type machine, a controller, a number of movable devices for registering type character and justification representations on the controller, each of said devices being operable to register representations of each of said classes, setting or selecting means operated in common by both classes of controller representations, and means for advancing the type character representations from the registering devices to the selecting means in the order in which the same are registered on the controller.

2. In a type machine, a controller, a number of movable devices for registering type character and justification representations on the controller, each of said devices being operable to register representations of each of said classes, setting or selecting means operated in common by both classes of controller representations, and means for advancing the type character representations from the registering devices to the selecting means in the order in which the same are registered on the controller, and means for causing the justification representations each to act upon the selecting means in advance of those type character representations representing the matter to which the justification is in each instance directed.

3. In a type machine, a controller consisting of a plurality of independently movable parts, each of which is adapted to have registered thereon any one of a number of type character representations and means for effecting such registrations on the controller parts.

4. In a type machine, a controller, means for registering type characters and justification thereon, selecting means operated by the controller, means for passing the controller to said first named means and from said first named to said second named means without reversing the order of feed of the character registrations thereon, and means for feeding the justification registrations to the second named means at rate of speed different from that at which the character registrations are fed to the same.

5. In a type machine, a controller, means for registering type characters and justification thereon, selecting means operated by the controller, means for passing the controller to said first named means and from said first named to said second named means without reversing the order of feed of the character registrations thereon, and means for delaying the feed of the character registrations while accelerating the feed of the justification registrations.

6. In a type machine, a controller, means for registering type characters and justification thereon, selecting means operated by the controller, means for passing the controller to said first named means and from said first named to said second named means without reversing the order of feed of the character regitsrations thereon, and independent passages for the justification and character registrations from said first to said second named means.

7. In a type machine, a controller, means for registering type characters and justification thereon, selecting means operated by the controller, means for passing the controller to said first named means and from said first named to said second named means without reversing the order of feed of the character registrations thereon, independent passages for the justification and character registrations from said first to said second named means, and means for delaying the character registrations in their passage until the appropriate justification registrations have by way of the other passage reached said second named means.

8. In a type machine, a controller, means for registering type characters and justification thereon, selecting means operated by the controller, means for passing the controller to said first named means and from said first named to said second named means without reversing the order of feed of the character registrations thereon, independent passages for the justification and character registrations from said first to said second named means, and means for placing either of said passages exclusively in communication with said second named means.

9. In a type machine, a controller, means for registering type characters thereon and for registering justification thereon behind the type character registrations, selecting means operated in common by the character and justification registrations of the controller, and means for passing the controller to the registering means and from the latter to the selecting means without reversal of direction.

10. In a type machine, a sectional controller, means for registering type characters and justification on the several sections of the controller, selecting means operated in common by all the controller sections to govern the casting of either type characters or justified space pieces as the case may be, and means for passing the controller to said first named means and from said first named to said second named means.

11. In a type machine, a controller, means for registering type characters thereon, and for thereafter registering justification thereon behind the character registrations; and selecting means operated in common by the justification and character registrations whereby first the justification registration and then the character registrations, the latter in the order registered, are caused to govern the operation of the selecting means.

12. In a type casting machine, a controller comprising a plurality of separably movable devices upon each of which either a type character or a justification may be registered, and means for effecting either of said registrations on the controller devices.

13. In a type casting machine, a controller consisting of a plurality of separably movable devices upon which the several characters and justifications are adapted to be registered, selecting means, and means whereby certain of the devices are caused to operate the selecting means in an order different from the order in which the registrations are made upon the devices.

14. In a type casting machine, a controller consisting of a plurality of separably movable devices upon which the several characters and justifications are adapted to be registered, selecting means, and means whereby those of the devices bearing the justification registrations are caused to operate the selecting means before the selecting means is operated by those devices bearing the character registrations.

15. In a type casting machine, a controller consisting of a plurality of separably movable devices upon which the several characters and justifications are adapted to be registered, selecting means, means whereby those of the devices bearing the justification registrations are caused to operate the selecting means before the selecting means is operated by those devices bearing the character registrations, and means for feeding the last devices to the setting mechanism in the order in which they have received their respective character registrations.

16. In a type casting machine, a controller consisting of a plurality of separably movable devices upon which the several characters and justifications are adapted to be registered, selecting means, means for registering upon said devices the characters and justifications, means whereby said registrations are caused to operate the selecting means, and means for carrying said devices to said registering means and for carrying the character registrations thereon to the selecting mechanism in the same order in which the character registrations have been effected.

17. In a type machine, a controller, means for registering characters and justifications on said controller, selecting means operated by the controller, said controller consisting of a plurality of separably movable devices, and means for conveying said devices in a continuous path through said registering and said selecting means.

18. In a type machine, a controller having an endless path of movement, means for registering characters and justifications on said controller, selecting means co-acting with all parts of the controller, and means for storing several lines of registrations between said registering and said selecting means so that the operator may work several lines ahead of the selecting mechanism.

19. In a type machine, a controller, means for registering characters and justifications on said controller, selecting means operated by the controller, said controller consisting of a plurality of separably movable devices, and means for storing a number of said devices, representing more than a line of composition, between said registering and said selecting means so that the operator may work considerably in advance of the selecting mechanism.

20. In a type casting machine, a controller consisting of a plurality of separably movable devices upon each of which, either a type character or a justification, may be registered, means actuated by the operator for registering upon said devices the characters and justifications, and selecting means operated by the controller devices independently of the operator.

21. In a type casting machine, a controller consisting of a plurality of separably movable devices upon each of which, either a type character or a justification, may be registered, means actuated by the operator for registering upon said devices the characters and justifications, and selecting means operated by the controller devices, and means for controlling the operation of the selecting means independently of the machine operator.

22. In a type machine, a controller composed of a succession of elements movable in an endless path, each of said elements carrying members each movable thereon to any one of several distinctive type character settings.

23. In a type machine, a controller composed of a succession of elements movable in an endless path, each of said elements carrying members each movable thereon to any one of several distinctive type character settings, and means for eliminating the settings of said last named members at a certain point of the path of movement of the controller elements through the machine.

24. In a type machine, a controller composed of individual elements, all of which are adapted to receive either a type character or a justification setting and means for effecting such settings of the controller elements.

25. In a type machine, a controller composed of separately movable individual elements, all of which are adapted to receive either a type character or a justification setting and means for effecting such settings of the controller elements.

26. In a type machine, a sectional controller, the several sections of which carry one or more devices adjustable in the plane of movement of the controller in a direction transverse to the direction of movement of the controller.

27. In a type machine, a sectional controller, the several sections of which have guides lying in the plane of movement of the controller and one or more devices adjustable along said guides.

28. In a type machine, a sectional controller, the several sections of which carry contact devices adjustable laterally over the face of the controller in the plane of the same from a normally inoperative position to a set position.

29. In a type machine, a controller composed of a succession of disconnected elements movable in an endless path, each of said elements being adapted to receive and carry during a part of its movement any one of several distinctive type character settings and means for effecting such settings of the controller elements.

30. In a type machine, a controller composed of separably movable elements, each element carrying one or more devices adapted to be set in different positions on the controller element according to the unit of set measurement of the type or space piece to be cast and means for effecting such settings of said devices.

31. In a type machine, a controller composed of separably movable elements each comprising a shaft and one or more devices adjustable along the shaft.

32. In a type machine, a controller composed of separably movable elements each comprising a shaft, and one or more disks adjustable along the shaft.

33. In a type machine, a controller composed of a series of shafts disposed transversely of the path of movement of the controller and one or more devices carried by each of said shafts and adjustable to different positions on the same.

34. In a type machine a controller comprising a number of independently movable sections having distinctive character or justification representations and a chute down which said controller sections are adapted to be fed by gravity during the operation of the machine.

35. In a type machine, a controller having contact devices adjustable thereon, and means for moving each of the contact devices to any one of several predetermined positions according to the set measurement of the type or space piece to be cast.

36. In a type machine, a controller having contact devices adjustable transversely to the path of movement of the controller, and stops movable to determine the adjusted positions of the contact devices.

37. In a type machine, a controller having contact devices adjustable transversely to the path of movement of the controller, stops movable to determine the adjusted positions of the contact devices, and means for moving the contact devices against the stops.

38. In a type machine, a controller having contact devices adjustable transversely to the path of movement of the controller, stops movable to determine the adjusted positions of the contact devices, and means for moving the contact devices against the stops, said last means being yieldable to permit the same to be returned to normal position without disturbing the setting of the contact devices.

39. In a type machine, a controller having contact devices adjustable transversely to the path of movement of the controller, and slidable stops movable into the path of transverse movement of the contact devices to interrupt such movement and determine the adjustment of said devices.

40. In a type machine, a sectional controller, each section of which carries one or more contact devices movable transversely of the path of movement of the controller, and movable stops to determine the transverse adjustment of said contact members.

41. In a type machine, a sectional controller, each section of which carries one or more contact devices movable transversely of the path of movement of the controller, movable stops to determine the transverse adjustment of said contact members, and means for arresting said controller sections one at a time opposite said stops to permit said contact devices to be set.

42. In a type machine, a sectional controller, each section of which carries one or more contact devices movable transversely of the path of movement of the controller, movable stops to determine the transverse adjustment of said contact members, and an escapement mechanism for arresting said controller sections one at a time opposite said stops to permit said contact devices to be set, and to release said sections when the contact devices are set.

43. In a type machine, a controller having a series of guides extending transversely to the path of movement of the controller and a plurality of contact devices adjustable in said guides, one of said contact devices being adjustable to the right and another to the left in said guides and means for adjusting the one contact to the right and the other to the left.

44. In a type machine, a controller having a series of guides extending transversely to the path of movement of the controller and a plurality of contact devices adjustable in said guides, one of said contact devices being adjustable to the right and another to the left in said guides, and a pair of levers for adjusting the one contact to the right and the other to the left.

45. In a type machine, a controller having a series of guides extending transversely to the path of movement of the controller and a plurality of contact devices adjustable in said guides, one of said contact devices being adjustable to the right and an another to the left in said guides, and a pair of levers for adjusting the one contact to the right and the other to the left, and a series of stops separately movable into the path of movement of the contacts along the guides to arrest the contacts in predetermined positions.

46. In a type machine, a controller having a series of guides extending transversely to the path of movement of the controller and a plurality of contact devices adjustable in said guides, one of said contact devices being adjustable to the right and another to the left in said guides and means for adjusting the one contact to the right and the other to the left, and a third adjustable contact device on each guide.

47. In a type machine, a controller having contact devices adjustable transversely to the path of movement of the controller, and means for moving the contact devices to predetermined set positions, and a mechanism for periodically arresting said controller to permit said contact moving means to set the contacts and for releasing said controller when said contacts have been set.

48. In a type machine, a controller having contact devices adjustable transversely to the path of movement of the controller, and means for moving the contact devices to predetermined set positions, and a mechanism for periodically arresting said controller to permit said contact moving means to set the contacts and for releasing said controller when said contacts have been set, said contact moving means and said arresting and releasing means being connected to each character key of the operator's keyboard, and means in the connections from the keys to releasing mechanism, whereby the action of the latter is delayed until after the contact devices have been set.

49. In a type machine, a sectional controller having elements for carrying the character registrations and other elements for carrying the justification registrations, means adapted to coöperate with the controller elements to set the type casting and justification mechanisms and means for segregating the justification elements of the controller from the character elements thereof to feed the same separately to the setting mechanism.

50. In a type machine, a sectional controller having elements for carrying the character registrations and other elements for carrying the justification registrations, means adapted to coöperate with the controller elements to set the type casting and justification mechanisms and means operated by the justification keys for segregating the justification elements of the controller from the character elements thereof to feed the same separately to the setting mechanism.

51. In a type machine, a sectional controller having elements for carrying the character registrations and other elements for carrying the justification registrations, means adapted to coöperate with the controller elements to set the type casting and justification mechanisms, and an electrically operated selecting device for segregating the justification elements of the controller from the character elements thereof to feed the same separately to the setting mechanism.

52. In a type machine, a sectional controller having elements for carrying the character registrations and other elements for carrying the justification registrations, means adapted to coöperate with the controller elements to set the type casting and justification mechanisms, a selecting device operated by the justification keys for segregating the justification elements of the controller from the character elements thereof to feed the same separately to the setting mechanism.

53. In a type machine, a sectional controller having elements for carrying the character registration and other similar elements for carrying the justification registrations, means adapted to coöperate with the controller elements to set the type casting and justification mechanisms and means for segregating the justification elements of the controller from the character elements thereof to feed the same separately to the setting mechanism.

54. In a type machine, a sectional controller having elements for carrying the character registrations and other similar elements for carrying the justification registrations, means adapted to coöperate with the controller elements to set the type casting and justification mechanisms, a selecting device operated by the justification keys for segregating the justification elements of the controller from the character elements thereof to feed the same separately to the setting mechanism.

55. In a type machine, a sectional controller having elements for carrying the character registrations and other elements for carrying the justification registrations, means adapted to coöperate with the controller elements to set the type casting and justification mechanisms and means for segregating the justification elements of the controller from the character elements thereof to feed the same separately to the setting mechanism, separate guide-ways for the character and justification elements to the setting mechanism, and means for switching said elements into their proper guide-way.

56. In a type machine, a sectional controller having elements for carrying the character registrations and other elements for carrying the justification registrations, means adapted to coöperate with the controller elements to set the type-casting and justification mechanisms and means for segregating the justification elements of the controller from the character elements thereof to feed the same separately to the setting mechanism, separate guide-ways for the character and justification elements to the setting mechanism and means controlled by the justification and character keys for switching said elements into their proper guide-way.

57. In a type machine, an index head comprising a series of contact elements, and a controller coöperating with said contact elements, the controller carrying adjustable contact elements which set are adapted to engage the contacts of the index head.

58. In a type machine, an index head comprising a series of contact elements, and a controller carrying contact elements, each of which is adjustable to engage any one of a plurality of the contacts of the index head.

59. In a type machine, an index head comprising a series of contact elements, and a controller carrying contact elements, each of which is adapted to coöperate with any one of a plurality of the contacts of the index head according to a selected setting.

60. In a type machine, an index head comprising a series of independently movable contact elements, a controller coöperating with the index head and carrying adjustable contacts which when set engage and according to the setting engage and move certain of the contacts of the index head.

61. In a type machine, an index head comprising a series of contact elements, a sectional controller, each section of which carries one or more contact elements movable lengthwise of such section to be presented to one or another of the contacts of the index head.

62. In a type machine, an index head comprising a series of contact elements, a sectional controller each section of which carries one or more adjustable contact elements, and means for feeding the controller sections successively to the index head.

63. In a type machine, an index head comprising a series of contact elements, a sectional controller each section of which is movable independently of the others and carries one or more adjustable contact elements, and means for feeding the controller sections successively to the index head.

64. In a type machine, an index head comprising a series of contact elements, a sectional controller each section of which carries one or more adjustable contact elements, and a rotary member for feeding the controller sections successively to the index head.

65. In a type machine, an index head comprising a series of contact elements, a sectional controller each section of which carries one or more adjustable contact elements, and means having a step by step movement to feed the controller sections successively to the index head.

66. In a type machine, an index head comprising a series of contact elements, a sectional controller each section of which carries one or more adjustable contact elements, and rotary means having a step by step movement to feed the controller sections successively to the index head.

67. In a type machine, an index head comprising a series of contact elements, a sectional controller each section of which is independently movable of the others and carries one or more adjustable contact elements, and rotary means having a step by step movement to feed the controller sections successively to the index head.

68. In a type machine, an index head comprising a series of contact elements, a sectional controller comprised of independent and movable devices some of which carry character registrations and others of which carry justification registrations, a magazine for holding the character elements, and a magazine for holding the justification elements, and means for releasing from their respective magazines the justification and character elements in the order desired, to permit the same to be conveyed to the index head.

69. In a type machine, an index head comprising a series of contact elements, a sectional controller comprised of separate and independently movable devices some of which carry character registrations and others of which carry justification registrations, a magazine for holding the character elements, and a magazine for holding the justification elements, and means for releasing from their respective magazines the justification and character elements in the order desired, and means for guiding the elements to the index head when released from the magazines.

70. In a type machine, an index head comprising a series of contact elements, a sectional controller comprised of separate and independently movable devices some of which carry character registrations and others of which carry justification registrations, a magazine for holding the character elements, and a magazine for holding the justification elements, and an escapement device for releasing from their respective magazines the justification and character elements in the order desired, to permit the same to be conveeyd to the index head.

71. In a type machine, an index head comprising a series of contact elements, a sectional controller comprised of separate and independently movable devices some of which carry character registrations and others of which carry justification registrations, a magazine for holding the character elements, and a magazine for holding the justification elements, and movable means for releasing from their respective magazines the justification and character elements in the order desired, to permit the same to be conveyed to the index head, said movable means having one position in which the justification magazine is open and the character magazine is closed, and another position in which the character magazine is open and the justification magazine closed.

72. In a type machine, an index head comprising a series of contact elements, a sectional controller comprised of separate and independently movable devices some of which carry character registrations and others of which carry justification registrations, a magazine for holding the character elements, and a magazine for holding the justification elements, and means for ejecting from their respective magazines the justification and character elements in the order desired, to permit the same to be conveyed to the index head.

73. In a type machine, type setting mechanism, an index head from which the type setting mechanism is controlled, a sectional controller coöperating with the index head to govern the setting mechanism, said controller being comprised of separate and independently movable devices, some of which carry character settings and others of which carry justification settings, character and justification keys for setting said controller devices, and means acting independently of said keys to feed said devices to the index head.

74. In a type machine, type setting mechanism, an index head from which the type setting mechanism is controlled, a sectional controller coöperating with the index head to govern the setting mechanism, said controller being comprised of separate and independently movable devices, some of which carry character settings and others of which carry justification settings, character and justification keys for setting said controller devices, a magazine for holding the character devices, a magazine for holding the justification devices, and means acting independently of said keys to feed said devices to the index head from their respective magazines in the order desired.

75. In a type machine, type setting mechanism, an index head from which the type setting mechanism is controlled, a sectional controller coöperating with the index head to govern the setting mechanism, said controller being comprised of separate and independently movable devices, some of which carry character settings and others of which carry justification settings, character and justification keys for setting said controller devices, and means controlled from the type setting mechanism to feed said controller devices to the index head.

76. In a type machine, type setting mechanism, an index head from which the type setting mechanism is controlled, a sectional controller coöperating with the index head to govern the setting mechanism, said controller being comprised of separate and independently movable devices, some of which carry character settings and others of which carry justification settings, character and justification keys for setting said controller devices, and means controlled from the type setting mechanism to feed said controller devices to the index head independently of the operation of the keys.

77. In a type machine, type setting mechanism, an index head from which the type setting mechanism is controlled, a sectional controller coöperating with the index head to govern the setting mechanism, said controller being comprised of separate and independently movable devices, some of which carry character settings and others of which carry justification settings, character and justification keys for setting said controller devices, a magazine for holding the character devices, a magazine for holding the justification devices, and means controlled from the type setting mechanism independently of said keys to feed said devices to the index head from their respective magazines in the order desired.

78. In a type machine, type setting mechanism, an index head from which the type setting mechanism is controlled, a sectional controller coöperating with the index head to govern the type setting mechanism, said controller being composed of separate and independently movable devices, some of which have character settings and others of which have justification settings, a magazine for the devices having the justification settings, and means whereby a controller device, which has been released from its magazine, operates to release another controller device.

79. In a type machine, type setting mechanism, an index head from which the type setting mechanism is controlled, a sectional controller coöperating with the index head to govern the type setting mechanism, said controller being composed of separate and independently movable devices, some of which have character settings and others of which have justification settings, a magazine for the devices having the character settings, a magazine for the devices having the justification settings, and means whereby a controller device which has been released from its magazine, operates to determine from which of the magazines a succeeding device shall be released.

80. In a type machine, a type setting mechanism, an index head from which the type setting mechanism is controlled, a sectional controller coöperating with the index head to govern the type setting mechanism, said controller being composed of separate and independently movable devices, some of which have character settings and others of which have justification settings, a magazine for the devices having the character settings, a magazine for the devices having the justification settings, and means whereby a controller device which has been released from its magazine, operates to determine from which of the magazines the next succeeding device shall be released.

81. In a type machine, type setting mechanism, an index head from which the type setting mechanism is controlled, a sectional controller coöperating with the index head to govern the type setting mechanism, said controller being composed of separate and independently movable devices, some of which have character settings and others of which have justification settings, a magazine for the devices having the character settings, a magazine for the devices having the justification settings, and means whereby a justification controller device which has been released from its magazine, operates to release another controller device from the character magazine.

82. In a type machine, type setting mechanism, an index head from which the type setting mechanism is controlled, a sectional controller coöperating with the index head to govern the type setting mechanism, said controller being composed of separate and independently movable devices, some of which have character settings and others of which have justification settings, a magazine for the devices having the character settings, a magazine for the devices having the justification settings, and means whereby a justification controller device which has been released from its magazine, operates to release the next succeeding controller device from the character magazine.

83. In a type composing and casting machine, mechanism for setting the machine for the casting of type, justification mechanism and mechanism for setting the latter, an index head from which both the casting and the justification setting mechanisms are operated, means for shifting said two setting mechanisms one at a time into operative relation to the index head, a sectional controller coöperating with the index head to govern the operation of the machine, said controller comprising separate and independently movable elements some of which have justification settings, others of which have character settings and still others of which have settings to control said shifting means, a magazine to hold the elements having the character and shift settings, a magazine to hold the justification elements, means operated by the shift elements to control the feed of the justification elements from their magazine to the index head, and means controlled by the justification elements to control the feed of the character elements from their magazine to the index head.

84. In a type composing and casting machine, mechanism for setting the machine for the casting of type, justification mechanism and mechanism for setting the latter, an index head from which both the casting and the justification setting mechanisms are operated, means for shifting said two setting mechanisms one at a time into operative relation to the index head, a sectional controller coöperating with the index head to govern the operation of the machine, said controller comprising separate and independently movable elements some of which have justification settings, others of which have character settings and still others of which have settings to control said shifting means, a magazine to hold the elements having the character and shift settings, a magazine to hold the justification elements, means operated by the shift elements to control the feed of the justification elements from their magazine to the index head.

85. In a type composing and casting machine, mechanism for setting the machine for the casting of type, justification mechanism and mechanism for setting the latter, an index head from which both the casting and the justification setting mechanisms are operated, means for shifting said two setting mechanisms one at a time into operative relation to the index head, a sectional controller coöperating with the index head to govern the operation of the machine, said controller comprising separate and independently movable elements some of which have justification settings, others of which have character settings and still others of which have settings to control said shifting means, a magazine to hold the elements having the character and shift settings, a magazine to hold the justification elements, and means controlled by the justification elements to control the feed of the character elements from their magazine to the index head.

86. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device movable in two directions to control both magazines according to the direction of movement of said device, and means for controlling the direction of movement of said device to select controller elements from either magazine.

87. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device pivotally mounted to rock in two directions to control both magazines according to the direction of movement of said device to select controller elements from either magazine.

88. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device pivotally mounted to rock in two directions to control both magazines according to the direction of movement of said device, and means for controlling the direction of movement of said device to select controller elements from either magazine, said direction controlling means being movable to engage said working device on either side thereof according to the direction in which the device is to be rocked.

89. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device pivotally mounted to rock in two directions to control both magazines according to the direction of movement of said device, and means for controlling the direction of movement of said device to select controller elements from either magazine, said direction controlling means being movable to engage said working device on either side thereof according to the direction in which the device is to be rocked, and means for shifting said direction controlling means from one to the other side of the rocking device.

90. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device pivotally mounted to rock in two directions to control both magazines according to the direction of movement of said device, and means for controlling the direction of movement of said device to select controller elements from either magazine, said direction controlling means being movable to engage said working device on either side thereof according to the direction in which the device is to be rocked, and an electrically controlled slide for shifting said direction controlling means from one to the other side of the rocking device.

91. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device movable in two directions to control both magazines according to the direction of movement of said device, and means for controlling the direction of movement of said device to select controller elements from either magazine, said direction controlling means reciprocating with each setting of the type casting and justification mechanisms.

92. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device movable in two directions to control both magazines according to the direction of movement of said device, and means for controlling the direction of movement of said device to select controller elements from either magazine, said direction controlling means reciprocating with each setting of the type casting and justification mechanisms, and means for setting said direction controlling device to determine in which direction the reciprocation thereof will move the magazine controlling device.

93. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device movable in two directions to control both magazines according to the direction of movement of said device, and means for controlling the direction of movement of said device to select controller elements from either magazine, said direction controlling means reciprocating with each setting of the type casting and justification mechanisms, and means controlled by a previously ejected controller element for setting said direction controlling device to determine in which direction the representation thereof will move the magazine controlling device.

94. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device movable in two directions to control both magazines according to the direction of movement of said device, and means for controlling the direction of movement of said device to elect controller elements from either magazine, said direction controlling means reciprocating with each setting of the type casting and justification mechanisms, and a slide electrically controlled by a previously ejected controller element for setting said direction controlling device to determine in which direction the reciprocation thereof will move the magazine controlling device.

95. In a type machine, a controller to govern the operation thereof, said controller being comprised of separate and independently movable elements some of which have justification settings and others of which have character settings, a magazine for holding the character elements when they have been set, a magazine for holding the justification elements when the same have been set, a device movable in two directions to control both magazines according to the direction of movement of said device, and means for controlling the direction of movement of said device to select controller elements from either magazine, said direction controlling means reciprocating with each setting of the type casting and justification mechanisms, and means controlled by each instance by the last ejected controller element for setting said direction controlling device to determine in which direction the reciprocation thereof will move the magazine controlling device.

96. In a type machine, a controller composed of elements, all of which are adapted to receive either a type character or justification setting, and selecting members, each of which latter acts in a double capacity to set a controller element for a type character or for a justification, as desired.

97. In a type machine, a controller composed of elements, all of which are adapted to receive either a type character or a justification setting, and index members controlling the casting mechanism, each of which index members is operable for type character or for justification setting by the several controller elements.

98. In a type machine, a controller consisting of a plurality of independently movable parts each of which is adapted to have registered thereon any one of a number of type character representations and justification representations and means for registering such representations on the controller parts.

99. In a type machine, a controller consisting of a plurality of disconnected, independently movable, parts capable of receiving and carrying distinctive type character representations and means for registering such representations on the controller parts.

100. In a type machine, a controller bearing distinctive type character representations means in which the controller is mounted to have movement by gravity, and means for elevating the controller so that the same may be released to its gravity movement.

101. In a type machine, a controller consisting of a plurality of disconnected, independently movable, parts capable of receiving and carrying distinctive type character representations means in which the controller parts are mounted to have movement by gravity, and means for elevating the controller parts so that the same may be released to their gravity movement.

102. In a type machine, a controller bearing distinctive type character and justification representations means in which the controller is mounted to have movement by gravity, and means for elevating the controller so that the same may be released to its gravity movement.

103. In a type machine, a controller consisting of a plurality of disconnected, independently movable, parts each capable of receiving and carrying distinctive type character and justification representations and means for effecting such representations on the controller parts.

104. In a type machine, a controller consisting of a plurality of disconnected, independently movable, parts capable of receiving and carrying distinctive representations, and shaped to permit of rolling movement through the machine and means for effecting such representations on the controller parts.

105. In a type machine, a controller consisting of a plurality of disconnected, independently movable, parts, each of which has rollers on which it is mounted.

106. In a type machine, a controller consisting of a plurality of disconnected, independently movable, parts, each of which has rollers on which it is mounted, and an endless guideway for the rollers.

107. In a type machine, a controller comprising devices each of which is adapted to be set and reset indefinitely both for type characters and justification and means for so setting and resetting the controller devices.

108. In a type machine, a controller comprising devices each of which is adapted to be set and reset indefinitely for different type characters and for different justifications and means for so setting and resetting the controller devices.

109. In a type machine, a matrix-setting mechanism, a justifier mechanism, selecting means adapted to be connected to either of said mechanisms, means for shifting the connection of the selecting means from one to the other of said mechanisms, and a connection for operating said shifting means, a controller for said selecting means, said controller being composed of disconnected independently movable elements some to control type character settings, some to control justification settings, and some so-called trip controllers to govern in conjunction with the justification elements, the action of said shifting means.

110. In a type machine, a matrix setting mechanism, a justifier mechanism, selecting means adapted to be connected to either of said mechanisms, means for shifting the connection of the selecting means from one to the other of said mechanisms, and a connection for operating said shifting means, a controller for said selecting means, said controller being composed of disconnected independently movable elements, some to control type character settings, some to control justification settings, and some so-called trip controllers to set the connection of said shifting means, and means whereby the connection of shifting means when set is operable by the next succeeding justification controller.

111. In a type machine, a matrix setting mechanism, a justifier mechanism, selecting means adapted to be connected to either said mechanisms, means for shifting the connection of the selecting means from one to the other of said mechanisms, and a connection for operating said shifting means, a controller for said selecting means, said controller being composed of disconnected independently movable elements, some to control type character settings, some to control justification settings, and means whereby the connection to the shifting means can only be operated to connect the selecting means to the justifier when the justification controller elements are in proper position with respect to the selecting means.

112. In a type machine, a matrix setting mechanism, a justifier mechanism, selecting means adapted to be connected to either said mechanisms, means for shifting the connection of the selecting means from one to the other of said mechanisms, and a connection for operating said shifting means, a controller for said selecting means, said controller being composed of disconnected independently movable elements, some to control type character settings, some to control justification settings, and means whereby the connection to the shifting means can only be operated to connect the selecting means to the justifier when the justification controller elements are in proper position with respect to the selecting means, and means for returning said shifting means connection to its normal unset condition.

113. In a type machine, a matrix-setting mechanism, a justifier mechanism, selecting means adapted to be connected to either of said mechanisms, means for shifting the connection of the selecting means from one to the other of said mechanisms, a controller for said selecting means, said controller being composed of disconnected independently movable elements, some to control the matrix settings for type characters, some to control the justifier settings for justification, and means operated by the justification controller elements for actuating said shifting means to connect the selecting means to the justifier in advance of the actual setting of the latter by the justification controller elements.

114. In a type machine, a matrix setting mechanism, a justifier mechanism, selecting means adapted to be connected to either of said mechanisms, means for shifting the connection of the selecting means from one to the other of said mechanisms, a controller for said selecting means, said controller being composed of disconnected independently movable elements, some to control the matrix settings for type characters, some to control the justifier settings for justification, and means operated by the justification controller elements for actuating said shifting means to connect the selecting means to the justifier in advance of the actual setting of the latter by the justification controller elements, said shift operating means being normally inoperable by the justification controller elements, and means for rendering said shift-actuating means operable by the justification controller elements.

115. In a type machine, a matrix-setting mechanism, a justifier mechanism, selecting means adapted to be connected to either of said mechanisms, means for shifting the connection of the selecting means from one to the other of said mechanisms, a controller for said selecting means, said controller being composed of disconnected independently movable elements, some to control the matrix-settings for type characters, some to control the justifier settings for justification, and means operated by the justification controller elements for actuating said shifting means to connect the selecting means to the justifier in advance of the actual setting of the latter by the justification controller elements, said shift operating means being normally inoperable by the justification controller elements, and means for rendering said shift-actuating means operable by the justification controller elements, and means for returning said shift actuating means to its normal setting after the setting of the justifier by the justification controller elements.

116. In a type machine, a matrix-setting mechanism, a justifier mechanism, selecting means adapted to be connected to either of said mechanisms, means for shifting the connection of the selecting means from one to the other of said mechanisms, a controller for said selecting means, said controller being composed of disconnected independently movable elements, some to control the matrix settings for type characters, some to control the justifier settings for justification, and means operated by the justification controller elements for actuating said shifting means to connect the selecting means to the justifier in advance of the actual setting of the latter by the justification controller elements, said shift operating means being normally inoperable by the justification controller elements, and means for rendering said shift actuating means operable by the justification controller elements, and means operated by certain of the type character controller elements for returning said shift actuating means to its normal setting after the setting of the justifier by the justification controller elements.

Signed by us at New York city, county and State of New York, this 14th day of May, 1909.

WILLIAM NICHOLAS.
WILLIAM ACKERMAN.

Witnesses:
EMMA W. RENNÉ,
W. H. HEAGERTY.